United States Patent [19]
Mokuo et al.

[11] Patent Number: 5,319,216
[45] Date of Patent: Jun. 7, 1994

[54] SUBSTRATE DETECTOR WITH LIGHT EMITTING AND RECEIVING ELEMENTS ARRANGED IN STAGGERED FASHION AND A POLARIZATION FILTER

[75] Inventors: Shori Mokuo, Kumamoto; Yoichi Deguchi, Tokyo; Mitsuo Nishi; Shinji Tadakuma, both of Kumamoto, all of Japan

[73] Assignees: Tokyo Electron Limited, Tokyo; Tokyo Electron Kyushu Limited, Tosu, both of Japan

[21] Appl. No.: 105,166

[22] Filed: Aug. 12, 1993

Related U.S. Application Data

[63] Continuation-in-part of Ser. No. 917,975, Jul. 24, 1992, Pat. No. 5,266,812.

[30] Foreign Application Priority Data

| Jul. 26, 1991 | [JP] | Japan | 3-208714 |
| Mar. 3, 1992 | [JP] | Japan | 4-080304 |
| Aug. 19, 1992 | [JP] | Japan | 4-242671 |
| Aug. 20, 1992 | [JP] | Japan | 4-242584 |
| Oct. 22, 1992 | [JP] | Japan | 4-308145 |
| Nov. 5, 1992 | [JP] | Japan | 4-321269 |

[51] Int. Cl.$^5$ .............................. G01V 9/04
[52] U.S. Cl. .............................. 250/561; 414/938
[58] Field of Search ........... 250/561, 548, 572, 557, 250/565; 356/356; 414/936, 937, 938, 331, 222

[56] References Cited

U.S. PATENT DOCUMENTS

| 5,151,754 | 9/1992 | Ishibashi et al. | 356/356 |
| 5,189,481 | 2/1993 | Jann et al. | 250/572 |

*Primary Examiner*—David C. Nelms
*Assistant Examiner*—Que T. Le
*Attorney, Agent, or Firm*—Oblon, Spivak, McClelland, Maier & Neustadt

[57] ABSTRACT

A substrate detector device comprises a boat or chuck for holding substrates, a light emitting section having a plurality of light emitting elements, arranged side by side, for respectively applying light beams to the substrates, a light receiving section, facing the light emitting section and having a plurality of light receiving elements, for receiving light beams passed through the substrates, the light receiving elements arranged side by side so as not face the light emitting elements, a polarization filter provided on optical axes of the respective optical beams incident on the light receiving elements, a memory for storing, as reference data, an amount of light received by a receiving element which has been measured in advance when a light beam is applied to a substrate in a state where no other substrate is present on either side of the substrate, and controller for discriminating the presence, the number, and the state of arrangement of the substrates on the holding means based on the reference data and measured data based on the amount of light received by the light receiving elements after a light beam scattered by the substrate to be detected and a light beam wraparound substrates adjacent thereto are removed by the polarization filter.

13 Claims, 19 Drawing Sheets

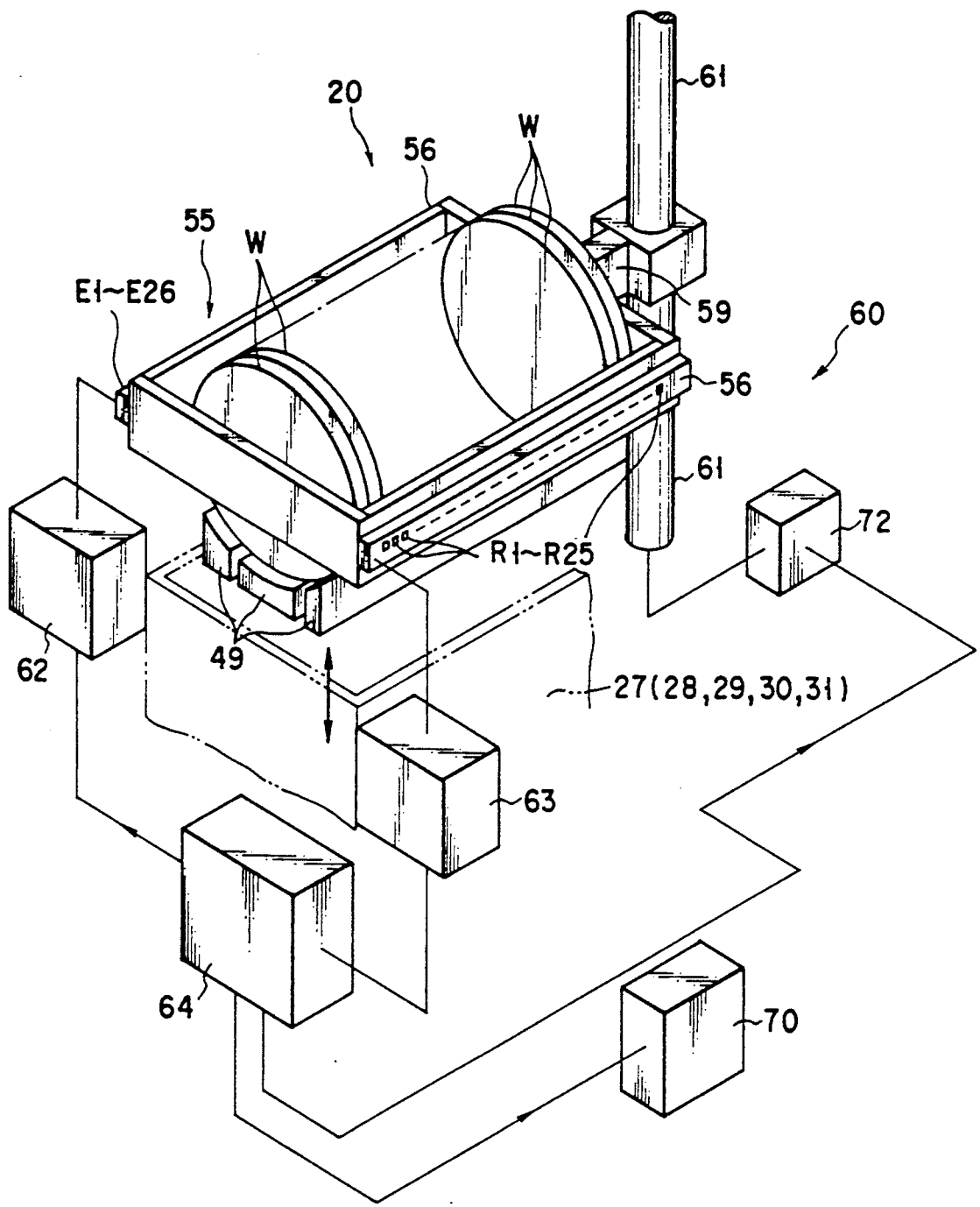
F I G. 2

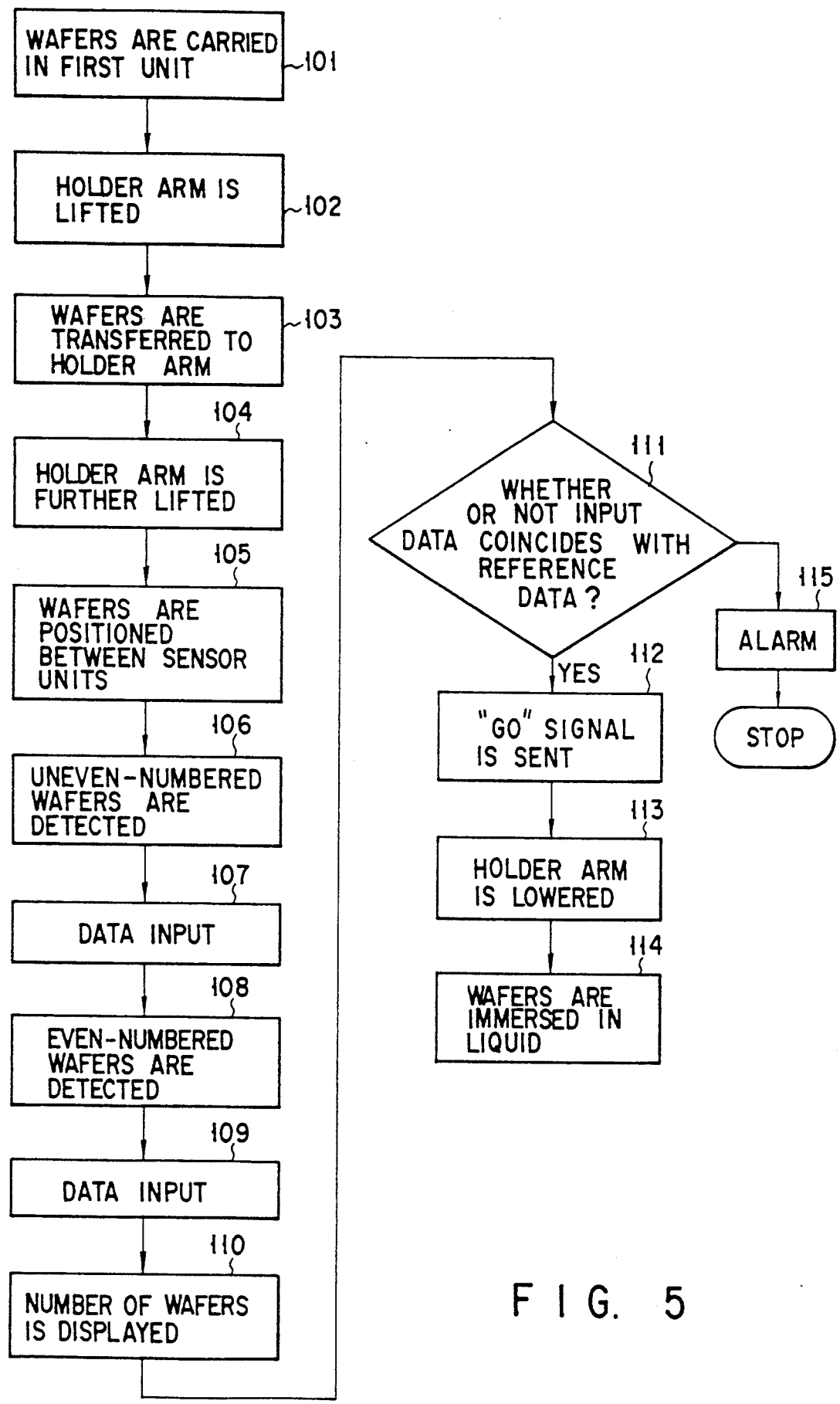
F I G. 5

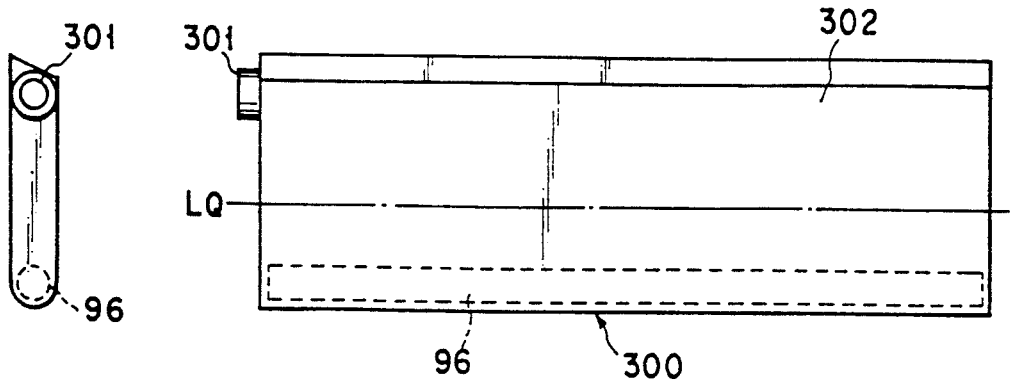
FIG. 14A
FIG. 14B
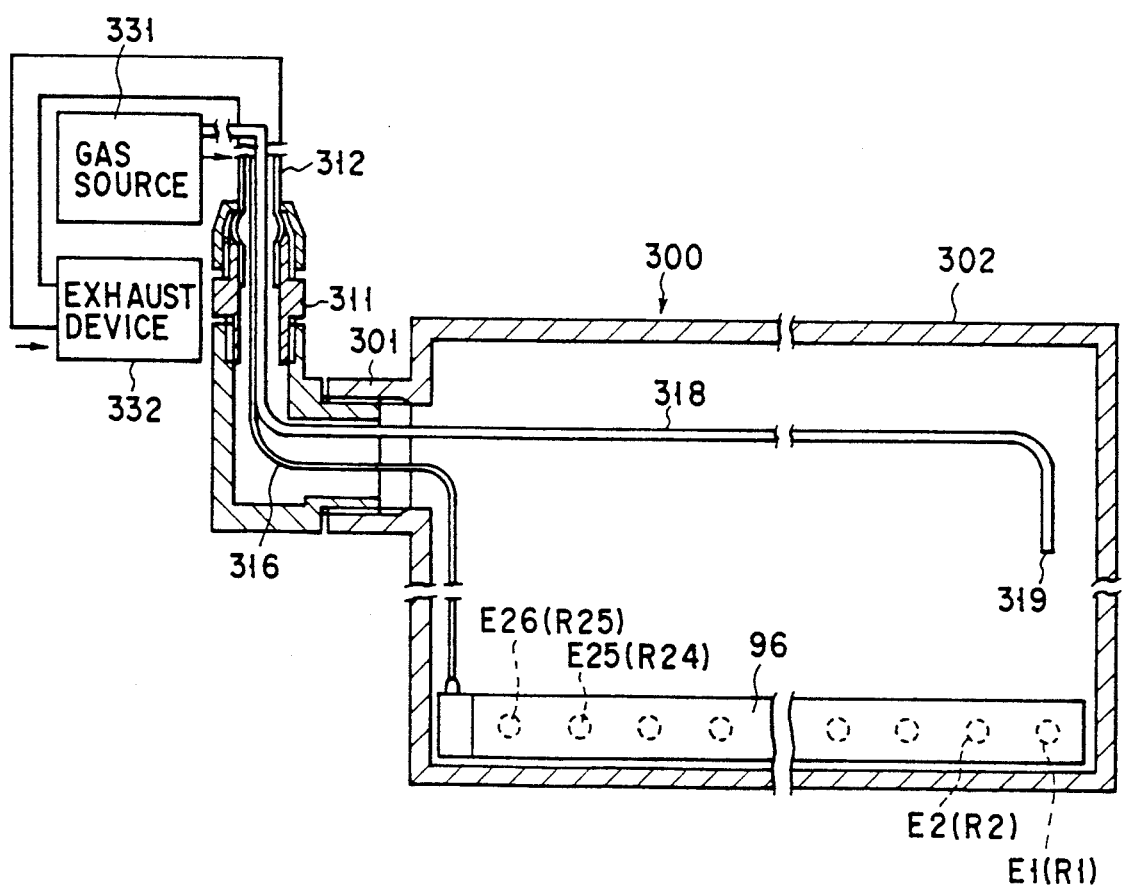
FIG. 15

SUBSTRATE DETECTOR WITH LIGHT EMITTING AND RECEIVING ELEMENTS ARRANGED IN STAGGERED FASHION AND A POLARIZATION FILTER

CROSS-REFERENCE TO THE RELATED APPLICATION

This application is a continuation-in-part of U.S. patent application Ser. No. 07/917,975 filed on Jul. 24, 1992 now U.S. Pat. No. 5,266,812.

BACKGROUND OF THE INVENTION

1. Field of the Invention

The present invention relates to a plate-like objects detector for detecting the state of each of plate-like objects (or detecting their presence, number, positional shift from their positions and the like) in the case where the plate-like objects such as semiconductor wafers, LCD substrates and printed boards are aligned in a column and processed as a batch.

2. Description of the Related Art

A plurality of semiconductor wafers are housed in a cassette and the wafers are carried as a lot from a place where a process is conducted to another place where a next process is to be conducted in the course of manufacturing semiconductor devices. 50 sheets of the wafers are batch-processed while immersing them in liquid as a lot in the washing and cleaning system, for example. In order to normally conduct the process, it is needed that the number of the wafers can be kept as previously determined and that they can be aligned as previously expected.

Jpn. Pat. Appln. KOKAI publication No. 62-133286 discloses a wafer counter having right emitting and receiving sections and a transparent infrared laser oscillator. In the wafer counter, a cassette is moved up and down and the number or the position of infrared laser beams interrupted by wafers is counted, thereby detecting the number or position of wafers in the cassette.

In this type of wafer counter, an infrared laser beam is reflected by the peripheral edge of a wafer, and the reflected light beam is applied to another wafer (an upper or lower wafer). Further, the reflected light beam becomes a number of scattered light beams, which are detected by the light receiving section, resulting in that the detection accuracy is greatly decreased.

If the number of wafers in the cassette is not accurately counted, the following inconveniences may occur when wafers are transferred in or from the cassette: it is impossible to hold wafers in the cassette without a vacant pocket (holding groove); and the detector erroneously detects that the cassette is vacant in a case where an unprocessed wafer remains in the cassette.

If the position of wafers is not accurately detected, a handling arm of a robot cannot hold wafers at a right position and the wafers cannot be inserted in the pockets (holding grooves) in the cassette. In this case, wafers may be damaged or the cassette may fall down.

Jpn. Pat. Appln. KOKAI publication No. 60-213209 discloses a positioning apparatus for directing the orientation flat of a wafer in a desired direction by use of an image sensor. In the positioning apparatus, the light emitting and receiving sections of an image sensor are fixed so as to face each other. When a wafer interrupts a infrared laser beam belt emitted by the light emitting section, the width of the interrupted light or a transparent light is detected by the light receiving section. Wafers are positioned based on the detected data so that the orientation flat is directed to a desired direction.

However, in the above positioning apparatus, since an infrared laser beam is reflected by the peripheral edge of a wafer and the reflected light beam is applied to inner walls of the apparatus and scattered, scattered light beams are detected by the light receiving section. Moreover, the wafer cannot be aligned at a predetermined position or wafers are shifted due to influenced of a noise signal of the scattered light beam.

Further, if shifted wafers are transferred into a plasma etching apparatus, the wafers cannot be placed at a right position of a static chuck (table). Hence, the static chuck is damaged by plasma. In addition, the directions of orientation flats of the wafers are different, resulting in variance of processes on the wafers.

SUMMARY OF THE INVENTION

An object of the present invention is to provide a substrate detector device in which an erroneous detection in a light receiving section can be prevented even if a light beam is scattered.

According to an aspect of the present invention, there is provided a substrate detector device for detecting the presence and the number of a plurality of substrates arranged face to face, the device comprising:

holding means for holding substrates;

light emitting means having a plurality of light emitting elements, arranged side by side, for respectively applying light beams to the substrates;

light receiving means, facing the light emitting means and having a plurality of light receiving elements, for receiving light beams passed through a space where the substrates are to be placed, the light receiving elements arranged side by side, the light receiving elements and the light emitting elements are arranged in a staggered fashion; and polarization filter means which allow passage of only optical beams emitted from the light emitting element and to be directly incident on the light receiving elements.

It is preferably that the substrate detector device comprises storage means for storing, as reference data, an amount of light received by a receiving element which has been measured in advance when a light beam is applied to a substrate in a state where no other substrate is present on either side of the substrate; and discriminating means for discriminating the presence and the number of the substrates on the holding means based on the reference data and data based on the amount of light received by the light receiving elements after a light beam scattered by the substrate to be detected and a light beam wrap-around substrates adjacent thereto are removed by the polarization filter means.

If the data based on the amount received light exceeds the reference data, the discriminating means determines that the substrate is not correctly placed at a position or is not present at the position.

With the substrate detector device of the present invention, since a scattered light beam (mainly, a reflected light beam) and a wrap-around light beam are removed by the polarization filter, only a light beam which is directly incident from the light emitting element is received by the light receiving elements. Therefore, a wafer can be detected at a high accuracy. Noise (noise signal resulting from a scattered light beam) included in the received light beam can be removed by software, in which case, the accuracy of detecting wafers can be further improved.

Further, polarization filter means can be provided on the light emitting section to further increase the accuracy of detecting a wafer. In this case, the polarization filter prevents a light beam which is emitted from the light emitting section from directly incident on the light receiving section without scattering by a wafer.

The reference data is obtained by measuring, in advance, an amount of light which a light emitting element receives when a light beam is applied to the substrate in a state where no other substrate is present on either side of the substrate. This is because, in such a state, the light receiving element receives only a direct light beam and the amount of the received light is maximum, since it is not influenced by a scattered light beam. Therefore, if the actual amount (measured value) of a received light beam exceeds the maximum amount (reference data value) of a light beam, it is determined that a scattered light beam or a wrap-around light beam is incident on the light receiving element.

Wrap-around of a light beam is caused when wafers are not correctly arranged, particularly when a wafer is missing from a wafer column. Hence, erroneous detection of a wafer due to a wraparound light beam can be avoided by subtracting a value corresponding to an amount of the wrap-around light beam from the values corresponding to amounts of light beams received by the adjacent light receiving elements, to correct the amounts of the light beams received by the adjacent light receiving elements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a perspective view showing the substrate detector device according to an embodiment of the present invention;

FIG. 5 is a flow chart showing how the first substrate detector device detects wafers;

FIG. 14A is a side view of the sensor unit;

FIG. 14B is a front view of the sensor unit;

FIG. 15 is a sectional view showing an internal structure of the sensor unit;

DETAILED DESCRIPTION OF THE PREFERRED EMBODIMENTS

Some embodiments of the present invention will be described with reference to the accompanying drawings. These embodiments will be applied, in this case, to the semiconductor wafers washing and cleaning system.

Figure 1:
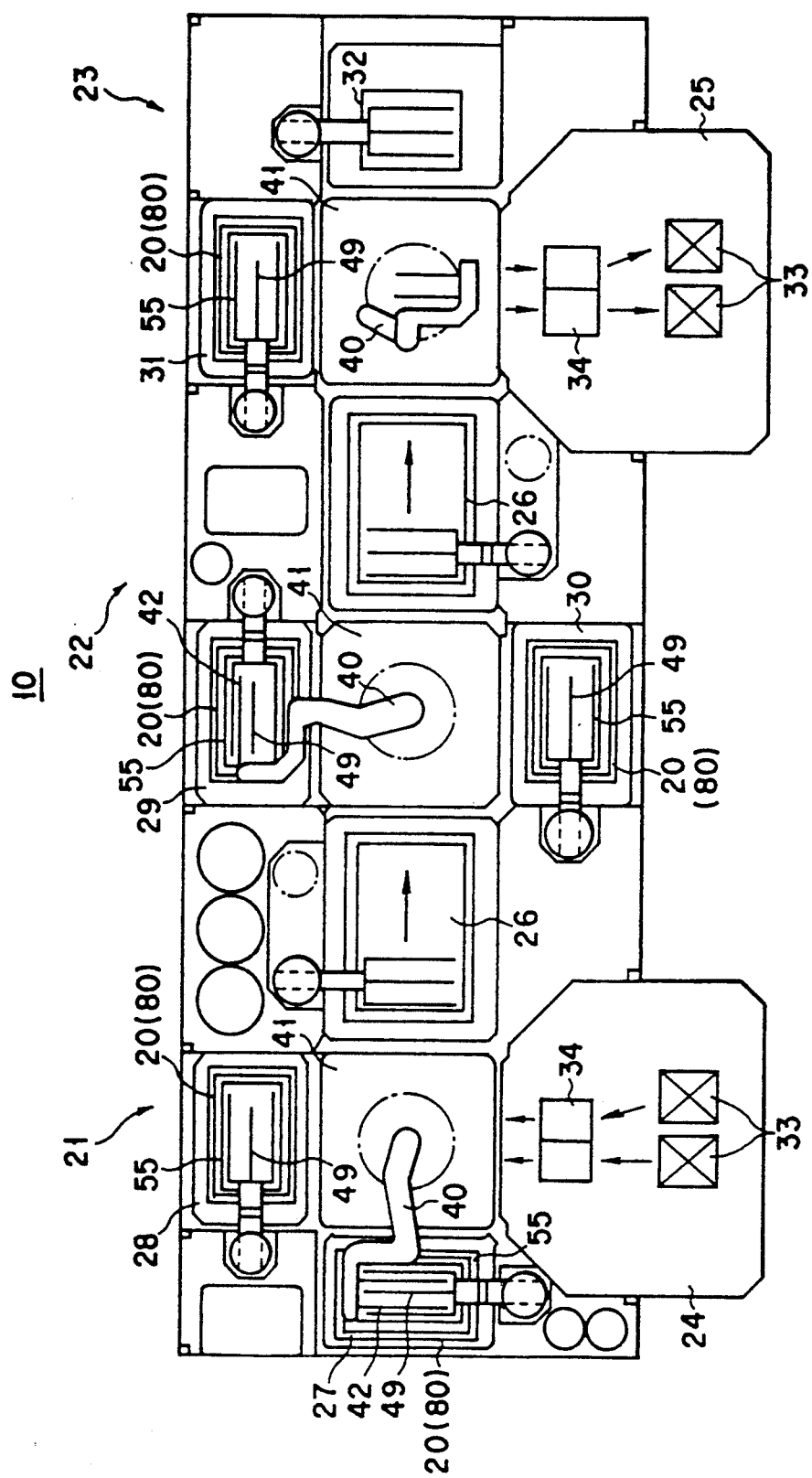
FIG. 1 is a plan showing the whole of the washing and cleaning system in which a substrate detector device according to the present invention is employed.

As shown in FIG. 1, a washing and cleaning system 10 includes three washing and cleaning process units 21, 22 and 23 arranged in sequence. The first unit 21 is located on that side of the system 10 where the semiconductor wafers W are carried into the system 10. The first unit 21 includes a loader 24 provided with stages 34.

The third unit 23 is located on that side of the system 10 where the semiconductor wafers W are carried out of the system 10. The third unit 23 includes an unloader 25 provided with stages 34. Wafer cassettes 33 are mounted on the stages 34, respectively. Each of the cassettes 33 houses twenth-five sheets of silicon wafers W.

An in-water loader 26 is arranged between the first 21 and the second washing and cleaning unit 22. Another in-water loader 26 is also arranged between the second 22 and the third washing and cleaning unit 23.

A box is arranged at the center home position of the first unit 21 and a wafer carrying arm 40 is located in the center of the top of the box 41. The base of the wafer carrying arm 40 is connected to shafts of plural stepping motors (not shown). The carrying arm 40 is made swingable and extensible on a plane by these motors. A wafer boat 42 is supported on the front end of the arm 40.

Two washing and cleaning process vessels 20 are located adjacent to the box 41. Ammonia water is contained, as process liquid, in one of the washing and cleaning process vessels 20 and washing water in the other in the case of this embodiment. The washing water vessel 20 is intended to apply the so-called quick damp rinse (QDR) to the wafers. In other words, it is intended to wash off ammonia from the wafers W.

Same wafers carrying arm 40 is arranged at the second unit 22. Two washing and cleaning process vessels 29 and 30 are located adjacent to another box 41 which is arranged at the home position of the unit 22. In short, two process vessels 29, 30 and two in-water loaders 26 are located enclosing the home position of the second unit 22. Hydrofluoric acid is contained, as process liquid, in the vessel 29 and washing water in the vessel 30.

Same wafers carrying arm 40 is arranged at the center home position of the third unit 23. Drying process vessels 31 and 32 which are intended to carry out the so-called IPA drying are located adjacent to a further box 41 arranged at the center home position of the unit 23.

Each of the process vessels 27, 28, 29, 30 and 31 at the units 21. 22 and 23 is provided with a wafers detector device 20. A wafers holder arm 49 is located just under the wafers detector device 20.

As shown in FIG. 2, a frame 55 of the wafers detector device 20 is attached to a column 61 through support arm 59. The frame 55 can be slid along the column 61 although it is kept fixed when the wafers are under process.

The frame 55 is shaped like a rectangle having two long sides and two short sides each being made of stainless steel, aluminium alloy or ceramics. A sensor unit 56 is attached to each of the two long sides of the frame 55. One of the sensor units 56 includes twenty-six light emitting elements E1-E26 arranged in series and the other also includes twenth-five light receiving elements R1-R25 arranged in series. The light emitting elements E1-E26 are opposed to their corresponding light receiving elements R1-R25 with the wafers W in the frame 55 interposed between them. That face of each of the two long sides of the frame 55 through which the light emitting E1-E26 or receiving elements R1-R25 are opposed to their corresponding ones has a window or made transparent so as to allow detecting light beams of the light emitting elements E1-E26 to be passed through.

The holder arm 49 is located under the frame 55. It comprises three members made of quartz and each of these quartz-made members has 50 grooves thereon. These grooves are intended to hold the wafers W therein and they have a pitch of 6.35 mm same as those on the inner face of the cassette 33 in the case of 8-inch wafers.

It is preferable that the holder arm 49 is made of one of soft and corrosion-resisting materials such as resins of the fluorane group. In the case of the washing and cleaning process in which liquids of strong acid and alkali are used, it is preferable that the holder arm 49 is made of resins (or tetrafluoroethylene) of the ethylene fluoride group, particularly of ethylene tetra- or trifluoride resin.

The holder arm 49 is supported by the column 61 of a lifter mechanism 60 through a ball nut. The column 61 is a ball screw, which is connected to the drive shaft of a stepping motor 72. The power switch of the motor 72 is connected to the output section of controller 64.

A transmission type infrared sensor, which can emit an infrared laser of a wavelength of 300 nm to 10 $\mu$m, is used as a sensor unit. Light receiving elements R1-R25 have light receiving openings 96a (see FIG. 11), preferably having a height ranging from 0.5 mm to 3 mm and a width ranging from 2 mm to 10 mm.

Figure 3:
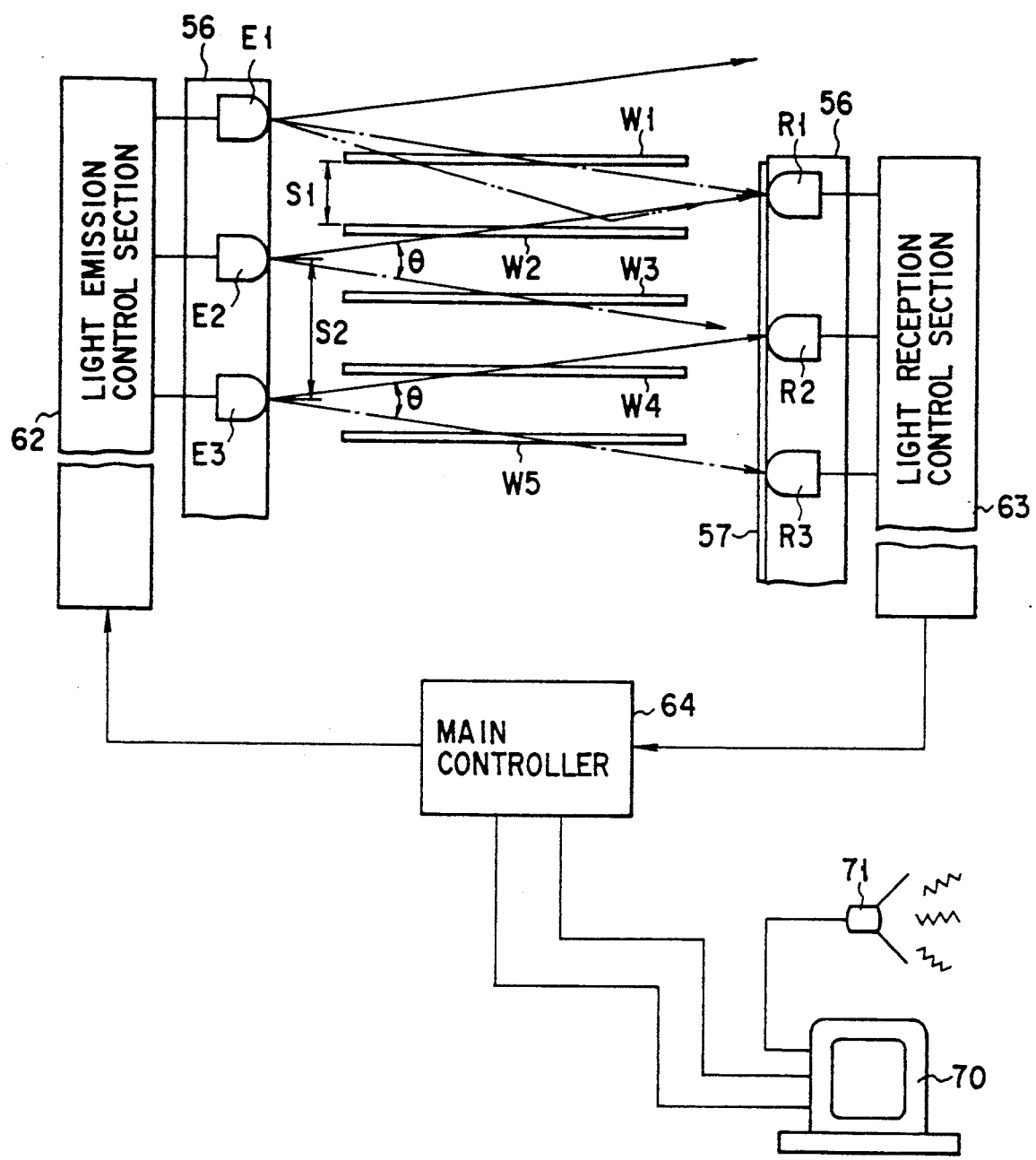
FIG. 3 is a block diagram schematically showing the first substrate detector device.

As shown in FIG. 3, fifty sheets of the 8-inch wafers W are interposed between the paired sensor units 56.

A polarization filter 57 is adhered on the front surface of the sensor unit 56 on the light receiving side. Light beams (infrared light beams) emitted from the elements E1-E25 are respectively received by the elements R1-R25 through the polarization filter 57.

Figures 6, 7:
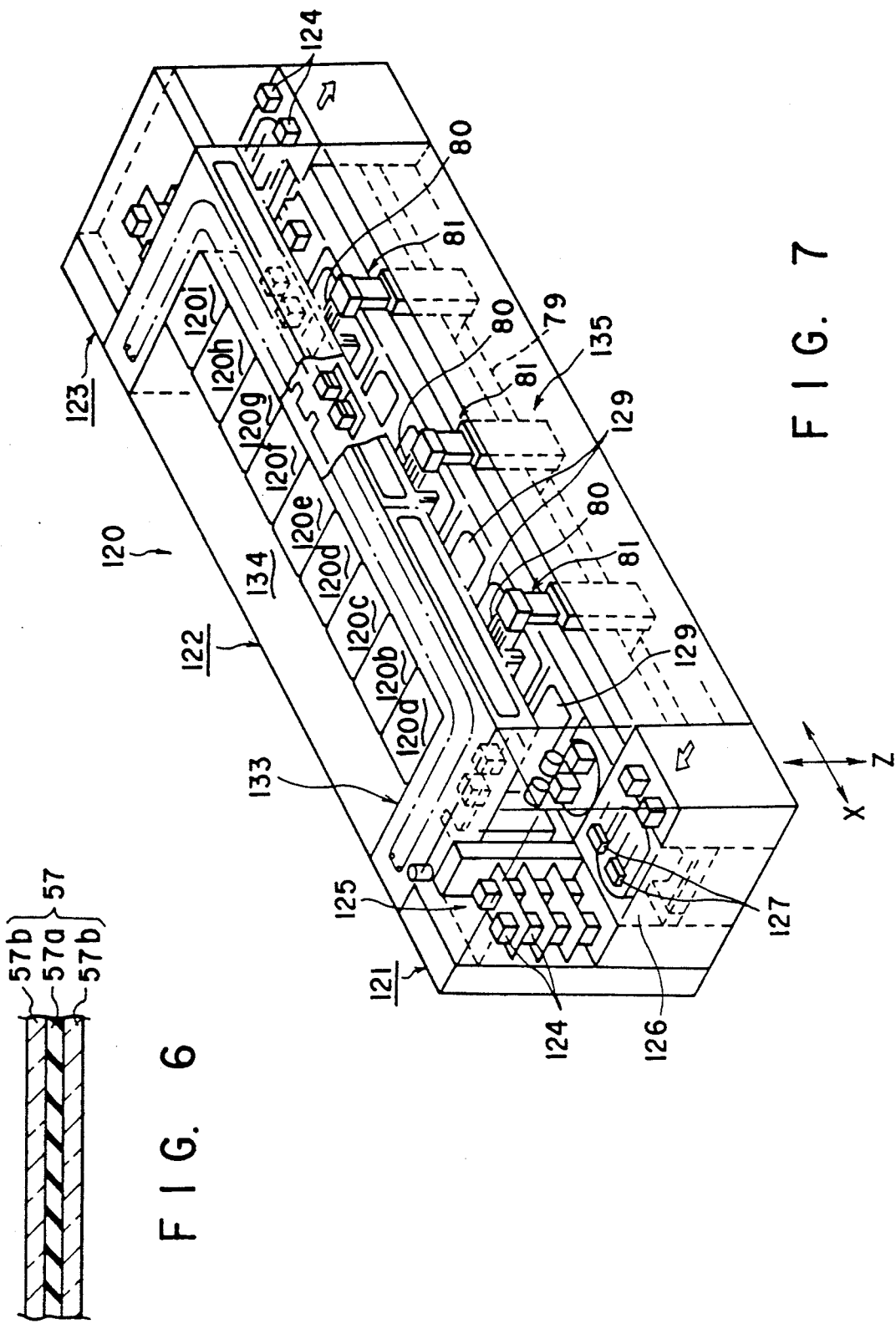
FIG. 6 is a sectional view showing a polarization filter.
FIG. 7 is a schematic perspective view showing a serial type substrate cleaning apparatus.

As shown in FIG. 6, the polarization filter 57 consists of a pair of transparent plates 57b and a macromolecular film 57a sandwiched therebetween. The macromolecular film 57a is made of a polyolefin resin sheet drawn in one direction. The transparent plate 57b is made of glass or a plastic such as acryl. It is preferable that the macromolecular film 57a be attached to the transparent plates 57b by an adhesive.

The wafers has a pitch interval S2 of 6.35 mm and the light emitting elements E1-E26 and receiving elements R1-R25 have a pitch interval S2 of 12.7 mm (two times the pitch interval S1). The wafers W1-W50, the light emitting elements E1-E26 and the light receiving elements R1-R25 are arranged in a staggered fashion. More specifically, the first wafer W1 is positioned to shield the light path through which light beam emitted from the first light emitting element E1 passes to the first light receiving element R1; and the second wafer W2 is positioned to shield the light path through which light beam emitted from the second light emitting element E2 passes to the second light receiving element R1. Same thing can be said about the other wafers and light emitting and receiving elements.

Each of the light emitting elements E1-E26 is connected to a light emission control section 62 and each of the light receiving elements R1-R25 to a light reception control section 63. These control sections 62 and 63 are backed up by a main controller 64. Light beams are sequentially emitted from the light emitting elements E1-E26 to the wafers W and the light beams which have passed through the wafers W are detected by the light receiving elements R1-R25. Each of the light emitting elements E1-E26 emits light beams in two directions. The two light beams emitted from each of the light emitting elements E1–E26 have an angle $\theta$ of 0.0213 when expressed in terms of tan $\theta$. The diameter of each light beam is smaller than 5 mm. The light beams are emitted for several milli-seconds.

Figure 4:
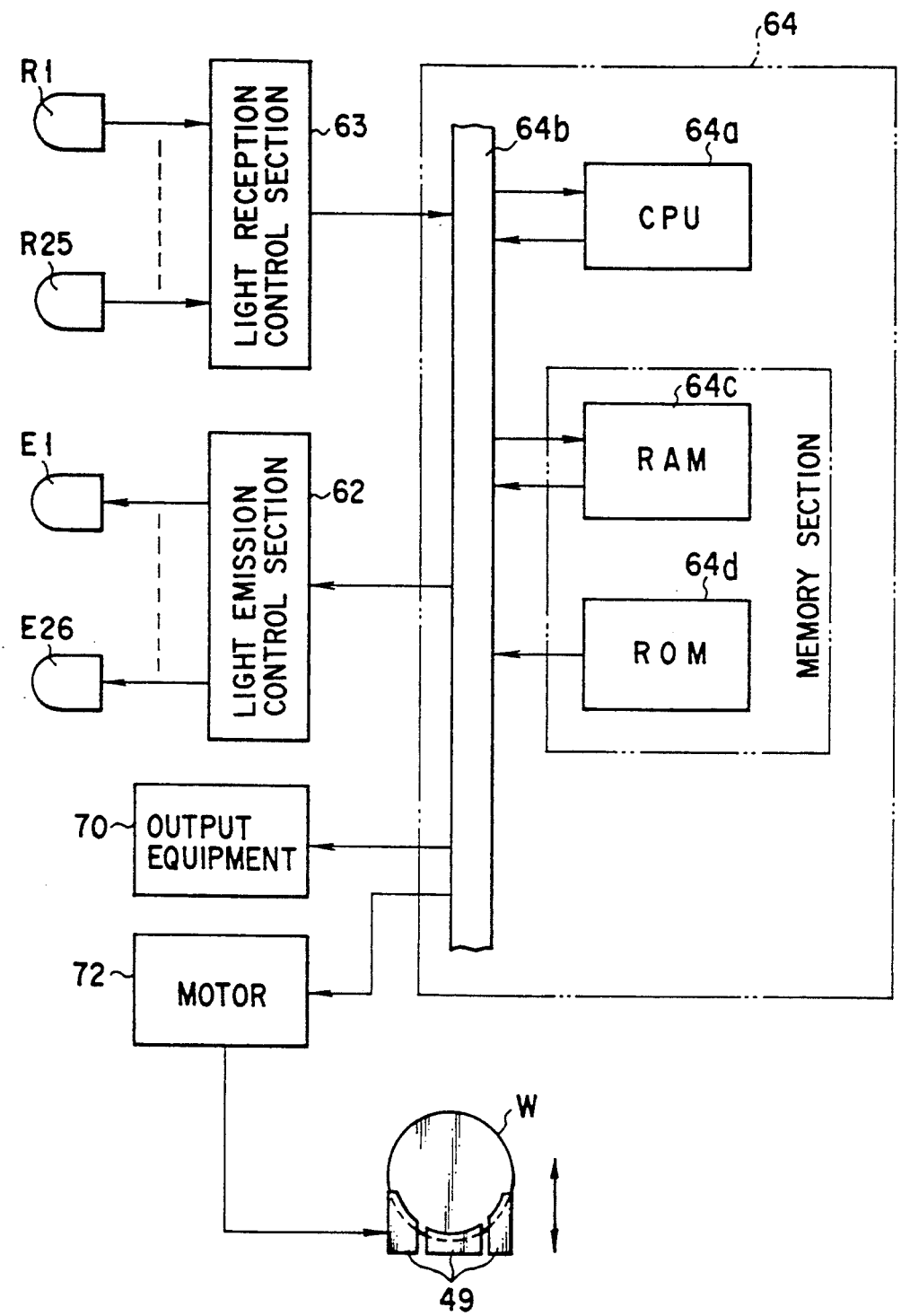
FIG. 4 is a system flow chart showing the system including main controller.

The main controller 64 and its peripheral equipments 62, 63, 70 and 72 will be described with reference to FIG. 4.

A CPU 64a of the main controller 64 is connected to the external equipments 62, 63, 70 and 72 via a system bus 64b. The CPU 64a is also connected to a RAM 64c and a ROM 64d at a memory section via the system bus 64b. Reference data which corresponds to signal obtained when normal wafers W are detected is stored in the ROM 64d.

Referring to FIG. 5, it will be described how the silicon wafers are detected before they are immersed into liquid.

Two cassettes 33 are carried to the loader 24 by carrying robot (not shown). Twenth-five sheets of silicon wafers W are housed in each of the cassettes 33. The cassettes 33 are mounted on the stages 34 and orientation flats of the wafers W are aligned by an alignment mechanism (not shown). The wafers W in the cassette 33 are pushed u from under the cassette 33 by a lifter (not shown) and the wafers W thus pushed up are held by a chuck (not shown). The wafers W thus chucked are carried into the box 41 at the first unit 21 and transferred onto the fork 42 of the carrying arm 40.

The carrying arm 40 is extended to the liquid vessel 27 to position its fork 42 just above the liquid vessel 27 (Step 101). The holder arm 49 is then lifted (Step 102) and 50 sheets of wafers W are transferred from the fork 42 to the holder arm 49 (Step 103).

The fork 42 is retreated and the holder arm 49 is further lifted (Step 104) to position 50 sheets of wafers a in the frame 55 (Step 105). The sensor elements E1–E26 and R1–R25 are thus positioned on both sides of a wafers column, as shown in FIG. 2. Also as shown in FIG. 3, the first detector R1 is positioned between the wafers a1 and W2 and the second emitter E2 is positioned between the wafers W2 and W3. The elements E2–E26 and R1–R25 are alternately positioned at their corresponding spaces between two of the wafers W1–W50 in this manner.

Each of the emitters E1–E26 emits one of its light beams and those light beams which have passed through the uneven-numbered wafers W1, W3, W5 - - - W49 are detected by the detectors R1–R25 (Step 106). These light beams thus detected are converted into electric signals by the light reception control section 63 and applied, as data, to the main controller 64 (Step 107). Each of the emitters E1–E26 then emits the other of its light beams and those light beams which have passed through the even-numbered wafers W2, W4, W6 - - - W50 are detected by the detectors R1–R25 (Step 108). These light beams thus detected are converted into electric signals by the light reception control section 63 and applied, as data, to the main controller 64 (Step 109). The time needed to detect all of the wafers W1–W50 is several milli-seconds in total.

The main controller 64 causes the external display 70 to display the number of wafers thereon on the basis of data obtained relating to the 50-sheet wafers (Step 110). Further, the main controller 64 finds whether or not 50 pieces of data inputted coincide with the reference data stored (Step 111). When all of the data inputted coincide with the reference data stored, "GO" signal is sent from the main controller 64 to the motor 72 (Step 112). The holder arm 49 is thus lowered (Step 113) and the wafers a are immersed in ammonia liquid (Step 114).

When one or some of the data inputted does or do not coincide with the reference data, "STOP" signal is sent from the main controller 64 to the external equipment 70 to sound an alarm 71. The process is thus stopped (Step 115).

According to the above-described first wafers detector device. The sensor unit 56 can be made shorter than the conventional ones, so that the device can be smaller-sized. In addition, the mechanism for scanning light beams is not needed. This also contributes to the smaller-sizing of the device and makes the creation of particles substantially zero. Further, a large number of wafers can be detected for shorter time period.

Detecting of wafers W with a high accuracy without using a polarization filter will now be described. In the following embodiment, noise is removed by a software improvement (a process in the main controller 64), rather than a hardware improvement (use of a polarization filter).

The ROM 64d stores, as reference data, an amount of light received by each of the light receiving elements R1–R25 when the light emitting elements E1–E25 are consecutively emits light in this order, in a state that no wafer is present in a detecting region. The ROM 64d also stores programs necessary for data processing in the CPU 64a. The program is prepared so that the measured value of the amount of a light beam received by each of the light receiving elements R1–R25 is compared with the reference data value, and if the measured value of the light received by a light receiving element (e.g., R3) exceeds the reference data value, a constant value is subtracted from the amount of the light beam received by the adjacent light receiving elements (R2 and R4). The CPU 64a executes an operation based on the program, and a correction signal is output. As a result, the detection values in the light receiving elements R2 and R4 can be more accurate.

In an operation using the above reference data, if the output (emission power) from the light emitting element E1 is 8 and the light receiving sensitivity of the light receiving element R1 is 10, the amount of light obtained by the pair of the light emitting element E1 and the light receiving element R1 is approximately 80 (8×10). If the light receiving sensitivity of the light receiving element R2 is 7, the amount of light obtained by the pair of the light emitting element E1 and the light receiving element R2 is approximately 56 (8×7).

The main controller 64 controls the light emission control section 62 and the light reception control section 63 to individually operate the light emitting elements E1–E25 and the light receiving elements R1–R25. The main controller 64 compares the amount of light measured when wafers W are present with the reference data value, detects a pair of a light emitting element E and a light receiving element R which causes an error due to noise, and determines that a wafer W is missing between the light emitting element E and the light receiving element R. Thereafter, a value obtained by subtracting a constant value corresponding to influence of a wraparound light beam (or a scattered light beam) from the amount of a light beam received by an element adjacent to the position where a wafer W is missing is determined to be a detection value of the adjacent element.

Half the difference between the reference data value and the measured value (where the reference data value is greater than the measured value) is employed as a constant value (correction value) which is subtracted from the amount of the light beam detected by the adjacent light receiving element. If the reference data value of the pair of the light emitting element E2 and the light receiving element R2 is 70 and the measured value is 140, it is determined that a third wafer W3 is missing. Then, the value obtained by subtracting 35 ($=(140-70)/2$) from the amount of a light beam received by the adjacent light receiving element R1 or R3 is considered to be a detection value of the light receiving element R1 or R3. It is preferable that 20 to 50% of the difference between the reference data value and the measured value be used as a correction value.

A second embodiment of the present invention will be described referring to FIGS. 7 to 18. Description on same components as those in the first embodiment will be omitted.

As shown in FIG. 7, a cleaning process device 120 comprises an inlet section 121, a cleaning process section 122, and an outlet section 133. The inlet section 121 comprises a standby section 125, a loader section 126, and a cassette transfer arm 127. In the loader section 126, wafers W are taken out from a cassette 124 by a loading mechanism (not shown), the orientation flats of the wafers W are aligned, and the number of the wafers W is counted.

The cleaning process section 122 includes a first chuck cleaning and drying process chamber 120a, a first solution process chamber 102b, a first rinsing process chamber 120c, a second rinsing process chamber 120d, a second solution process chamber 120e, a third rinsing process chamber 120f, a fourth rinsing process chamber 120g, a second chuck cleaning and drying process chamber 120h, and a wafer drying process chamber 120i. Each of the cleaning or process chambers (hereinafter referred to as process chambers) 120a to 120i has a process vessel 129.

The cleaning process section 122 includes a wafer transfer section 135 on one side thereof. The wafer transfer section 135 comprises three robots 81 which are movable along a linear guide 79. Each of the robot 81 has a wafer chuck 80 which can hold twenty-five wafers W at a time. The wafer chuck 80 is moved horizontally (in X and Y directions) and vertically (in a Z direction) by the robot 81.

Figure 8:
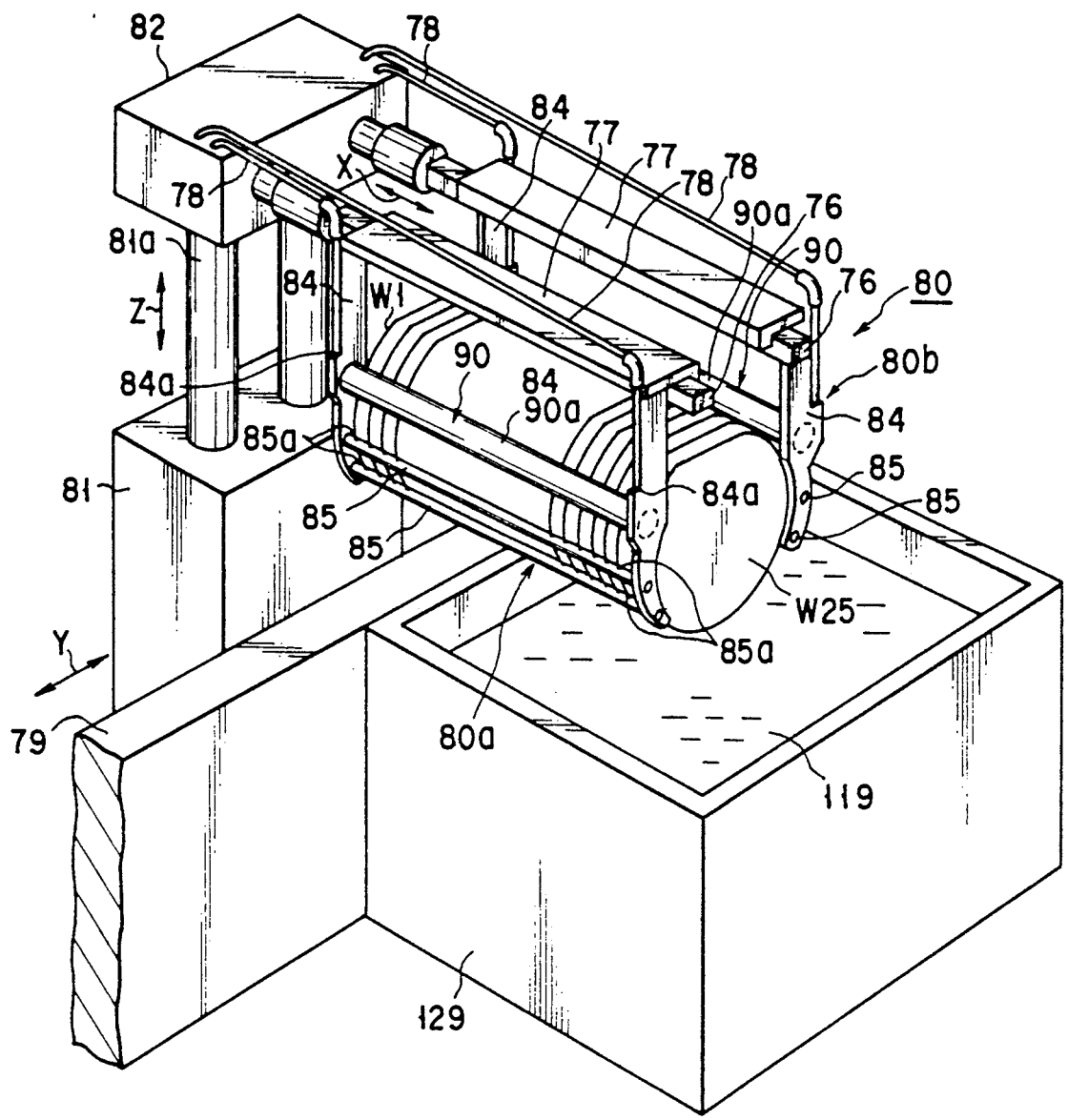
FIG. 8 is a block diagram schematically showing the substrate detector device to a part of which modification has added.

As shown in FIG. 8, a pair of sensor units 90 are arranged on both sides of a wafers chuck 80. A pair of horizontal arms 83 of the wafers chuck 80 extend from an upper gear case 82 and they can be reciprocated in the horizontal direction. Four pillars 84 are suspended from the horizontal arms 83. Support rods 85 are bridged between the two opposed pillars 84, respectively. The wafers a are held in grooves 85a on the support rods 85. 50 grooves 85a are formed on each of the support rods 85 at pitch interval of 6.35 mm.

Figure 9:
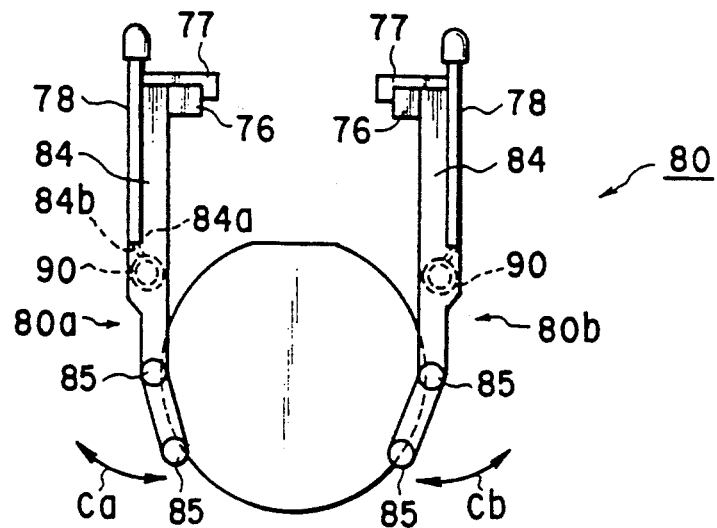
FIG. 9 is a view showing a wafer chuck to which a sensor unit (substrate detector device) is attached, viewed from the longitudinal direction.

As shown in FIGS. 8 and 9, the wafer chuck 80 has a pair of symmetrical holding arms 80a and 80b, which can be opened and closed by the robot 81. Proximal end portions of the holding arms 80a and 80b are coupled with gears and pulleys provided in a box 82. The box 82 includes a stepping motor for driving the gears and the pulleys. The holding arms 80a and 80b can be moved in parallel in the X direction and rotated along axes Ca and Cb. As the holding arms 80a and 80b are rotated along the axes Ca or Cb, the wafers W are held or released.

The structure of only the holding arm 80a on the light emitting sensor unit side will be described, for reasons of simplification.

Figure 10:
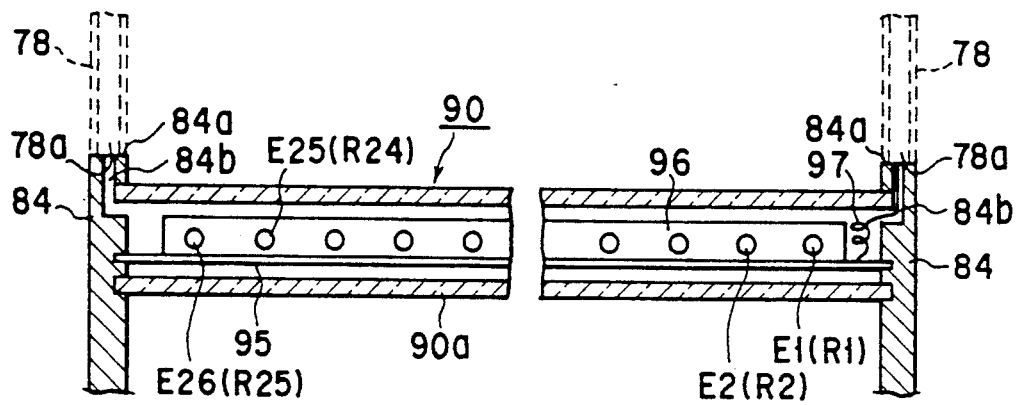
FIG. 10 is a sectional view showing a sensor section of the substrate detector device sectioned in the longitudinal direction thereof.

The holding arm 80a is a frame assembly comprised of a horizontal member 76, a horizontal plate 77, two vertical members 84, and two holding bars 85. On each holding bar, twenty-five grooves 85a are formed at regular intervals. The members 76, 77, 84 and 85 of the holding arm 80a are all made of quartz. Two gas supplying tubes 78 are attached to the frame assembly 80a. A dry nitrogen gas is supplied to the gas supplying tubes 78 from a gas supplying source (not shown). As shown in FIG. 10, the distal opening 78a of each of the tubes 78 is located at a step portion 84a of the vertical member 84 and communicates with an internal path 84b.

Each of the sensor units 90 is supported by a lower gear case 81 through a bracket 89. The lower gear case 81 is connected to the upper gear case 82 through two shafts 81a to move the upper gear case 82 up and down. The lower gear case 81 is attached to a linear guide 79 to move along the guide 79 in the horizontal direction (or direction perpendicular to the extending direction of the arms 83).

As shown in FIG. 10, a holder 96 is housed in an outer cylinder 90a of the sensor unit 90. The outer cylinder 90a is made of transparent quartz and it serves as a protection cylinder for protecting sensor elements attached to the holder 96. It may be made of corrosion resisting material such as SiC.

The holder 96 is made of synthetic resin and mounted on a printed board 95. Twenty-five or twenth-six holes 96a are formed in the holder 96 and light emitting elements E1-E26 (or light receiving elements R1-R25) are fitted in the holes 96a, respectively. The light emitting elements E1-E26 (or light receiving elements R1-R25) are connected to a circuit on the printed board 95. The printed board 95 is connected to a cable 97 through a connector 98.

Figure 11:
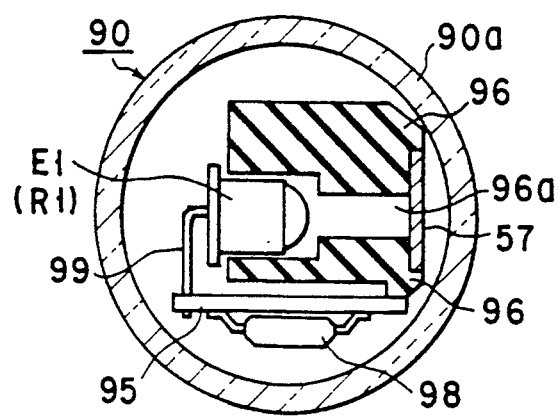
FIG. 11 is a sectional view showing a part of the sensor section of the substrate detector device crossed.

As shown in FIGS. 10 and 11, the sensor element E1 (or R1) is connected to the circuit on the printed plate 95 via a rear lead line 99. Same thing can be said about the other sensor elements E2-E26 (or R1-R25).

The sensor unit 90 is supported by the pair of vertical members 84 in a substantially horizontal position. The light emitting elements E1-E26 are held in the outer cylinder (quartz cylinder) 90a of the sensor unit 90. The quartz cylinder 90a is airtight. Internal space of the quartz cylinder 90a communicates with internal paths 84b. Both ends of the quartz cylinder 90a are sealed with the pair of vertical members 84. In this embodiment, the ends of the quartz cylinder are engaged with the vertical members 84 or attached thereto by welding.

As shown in FIGS. 10 and 11, twenty-six light emitting elements E1-E26 are held in the holder 96 in the quartz cylinder 90a. The optical axis of each of the light emitting elements E1-E26 is directed to the hole 96a of the holder 96. A polarization filter 57 is fitted in the hole 96a. The holder 96 is made of an insulating material such as resin or ceramic.

The light emitting elements E1-E26 are connected to a printed board 95 with a wire 99. The printed board 95 is connected to a light emitting circuit 98. The printed board 95 and the light emitting circuit 98 are connected to the control section 62 through a cable 97.

Figure 12:
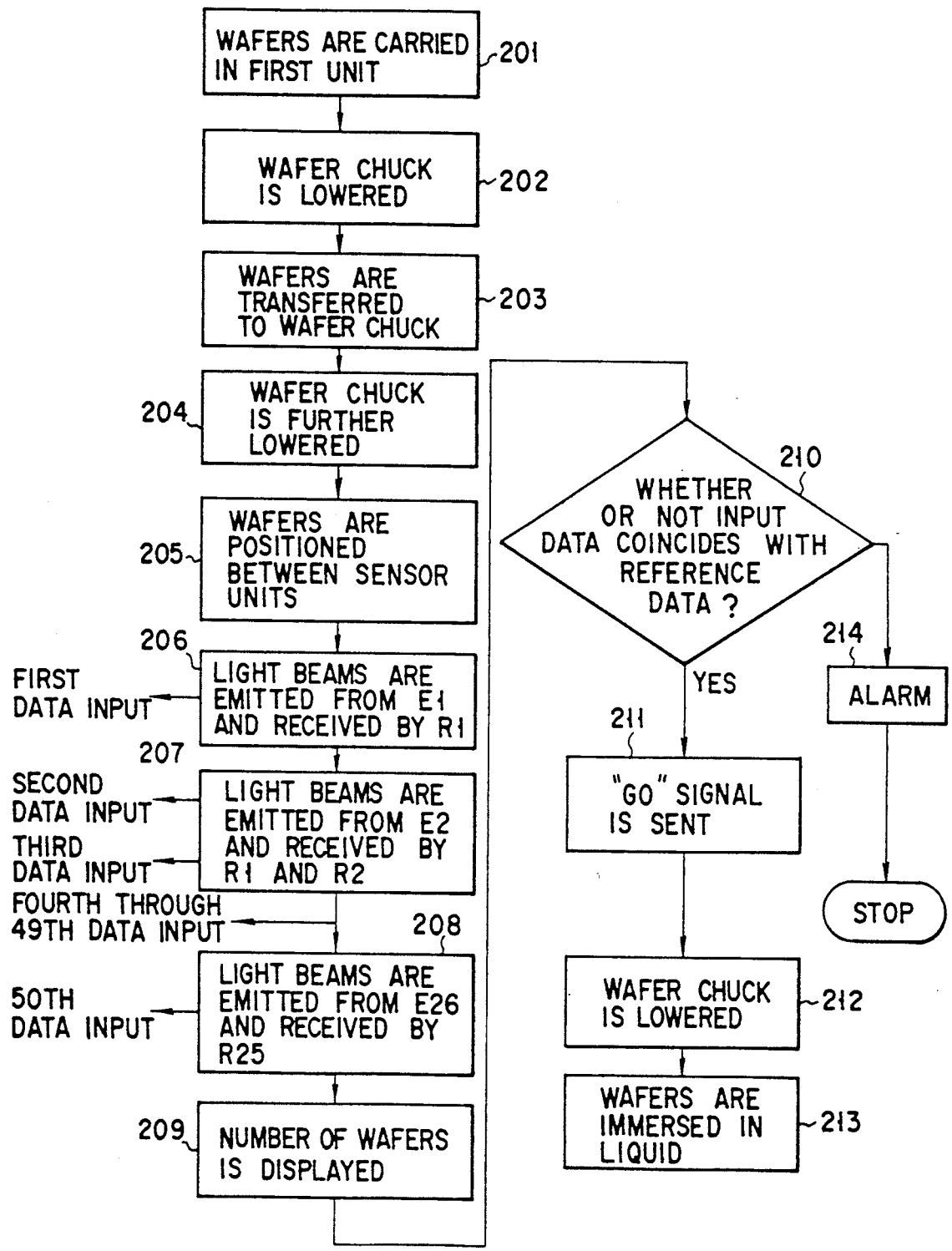
FIG. 12 is a flow chart showing how the second substrate detector device detects wafers.
Figure 13:
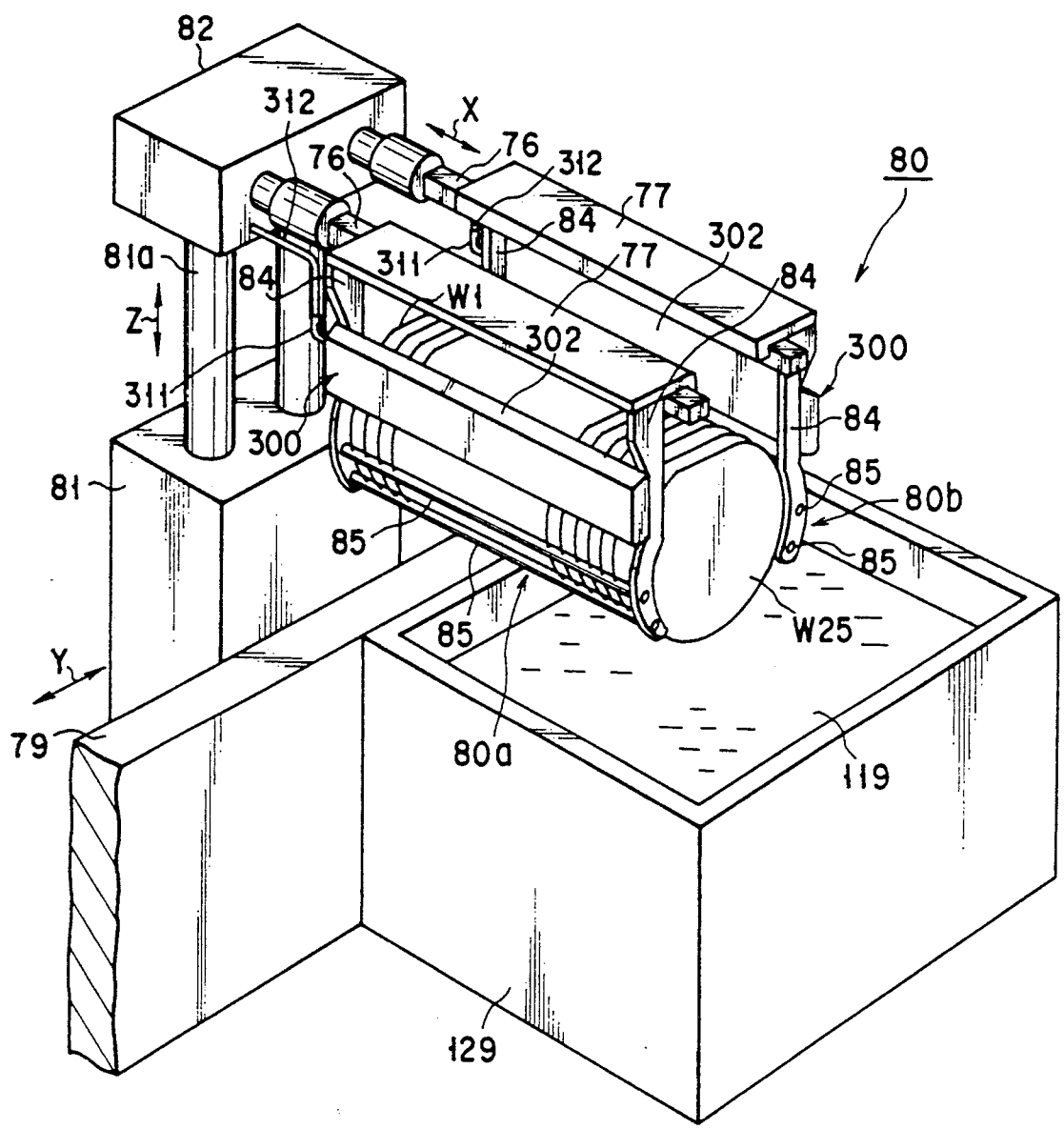
FIG. 13 is a schematic perspective view showing a wafer transfer device, a wafer chuck, and a process vessel.

Referring to FIG. 12, it will be described how the silicon wafers are detected before they are immersed in liquid.

Two cassettes 124 are carried to the loader 126 by the carrying robot (not shown). Twenty-five sheets of the silicon wafers W are housed in each of the cassettes 124. The cassettes 124 are mounted on the stages by the device 127 and orientation flats of the wafers in each of the cassettes 124 are aligned by the alignment mechanism (not shown). The wafers W are pushed up from under the cassettes 124 by the lifter (not shown) and held by the chuck (not shown). The wafers W thus chucked are carried into the the first unit 120a.

The carrying arm is extended to the liquid vessel 129 to position a fork (not shown) just above the liquid vessel 129 (Step 201). The wafer chuck 80 is then lowered (Step 201) to chuck all of the wafers W on the fork. When the fork is retreated, the wafers W are transferred from the fork to the wafer chuck 80 (Step 203).

After the fork is retreated, the wafer chuck 80 is further lowered (Step 204) to position 50 sheets of the wafers W between the paired sensor units 90 (Step 205).

Light beam is emitted only from the first emitter E1 and the light beam which has passed through the first wafer W1 is detected by the first receiver R1. The light beam thus detected as converted into electric signal by the light emission control section 63 and applied as a first data to the main controller 64 (Step 206).

Light beams are then emitted only from the second emitter E2 and the one which has passed through the second wafer W2 is detected by the first receiver R1 while the other which has passed through the third wafer W3 is detected by the second receiver R2. These light beams thus detected are converted into electric signals by the light reception control section 63 and applied as second and third data to the main controller 64 (Step 207). Similarly, the third through 25th emitters E3-E25 are successively made operative and fourth through 49th data obtained from light beams which have passed through the fourth through 49th wafers W4-W49 are successively applied to the main controller 64.

Finally, light beams are emitted from the 26th emitter E26 and which has passed through the 50th wafer W50 is detected by the 25th detector R25. These light beams thus detected are converted into electric signals by the light reception control section 63 and applied as 50th data to the main controller 64 (Step 208). The time needed to detect all of 50-sheet wafers in this manner is several milli-seconds.

The main controller 64 causes the external display 70 to display the number of the wafers thereon on the basis of 50 pieces of data obtained (Step 209). Further, the main controller 64 finds whether or not the 50 pieces of data inputted coincide with the reference data stored (Step 210). When all of the data inputted coincide with the reference data stored, "GO" signal is sent from the main controller 64 to the motor (not shown) (Step 211). The wafer chuck 80 is thus further lowered (Step 212) and the wafers W are immersed in ammonia liquid (Step 213).

When one or some of the data inputted does or do not coincide with the reference data stored, "STOP" signal is sent from the main controller 64 to the external equipment 70 to sound the alarm 71. The process is thus stopped (Step 214).

According to the second device, the light emitting elements are made operative one by one to emit light beams to their corresponding light receiving elements. Each of the wafers W can be therefore detected with a higher reliability.

When light beams are shot to the semitransparent silicon wafers, the device is liable to be wrongly operated because of beams scattered. In the case of the above-described second detector, however, the wafers W are detected one by one. The malfunction of the device which may be caused by beams scattered can be avoided accordingly.

A wafer counter according to another embodiment will be described with reference to FIGS. 13, 14A, 14B, and 15.

In this embodiment, a rectangular case 302 is used as a housing of a sensor unit 300. An opening portion 301 is formed at an end of the rectangular case 302. A pipe 312 is connected to the opening portion 301 with a coupling 311. A cable 316 and a gas supplying tube 318 are inserted through the pipe 312. The gas supplying tube 318 communicates with a gas supplying source 331 which stores a dry nitrogen gas. The cable 316 is connected to a printed board (not shown) and a controller (not shown). A distal opening 319 of the gas supplying tube 318 extends in an inner portion of the case 302.

The pipe 312 communicates with an exhaust device 332. The gas introduced into the case 302 through the gas supplying tube 318 is discharged through the pipe 312 to the outside by the exhaust device 332.

A sensor holder 96 is provided on the bottom of the case 302. As shown in FIGS. 10 and 11, light emitting elements E1-E26 or light receiving elements R1-R25 are held in the holder 96. The case 302 is attached to the vertical frame 84 such that the upper half of the case 302 is located above upper edges of wafers W. With this structure, wafers are immersed in a liquid 119 to a level of the chain line LQ shown in FIG. 14A when they are washed, and the opening portion 301 and the coupling 311 are not brought into contact with the liquid 119.

According to this embodiment, since a sealing portion of the sensor unit 300 is not immersed in the liquid 119, the opening portion 301 and the coupling 311 can be sealed easily.

Figure 16:
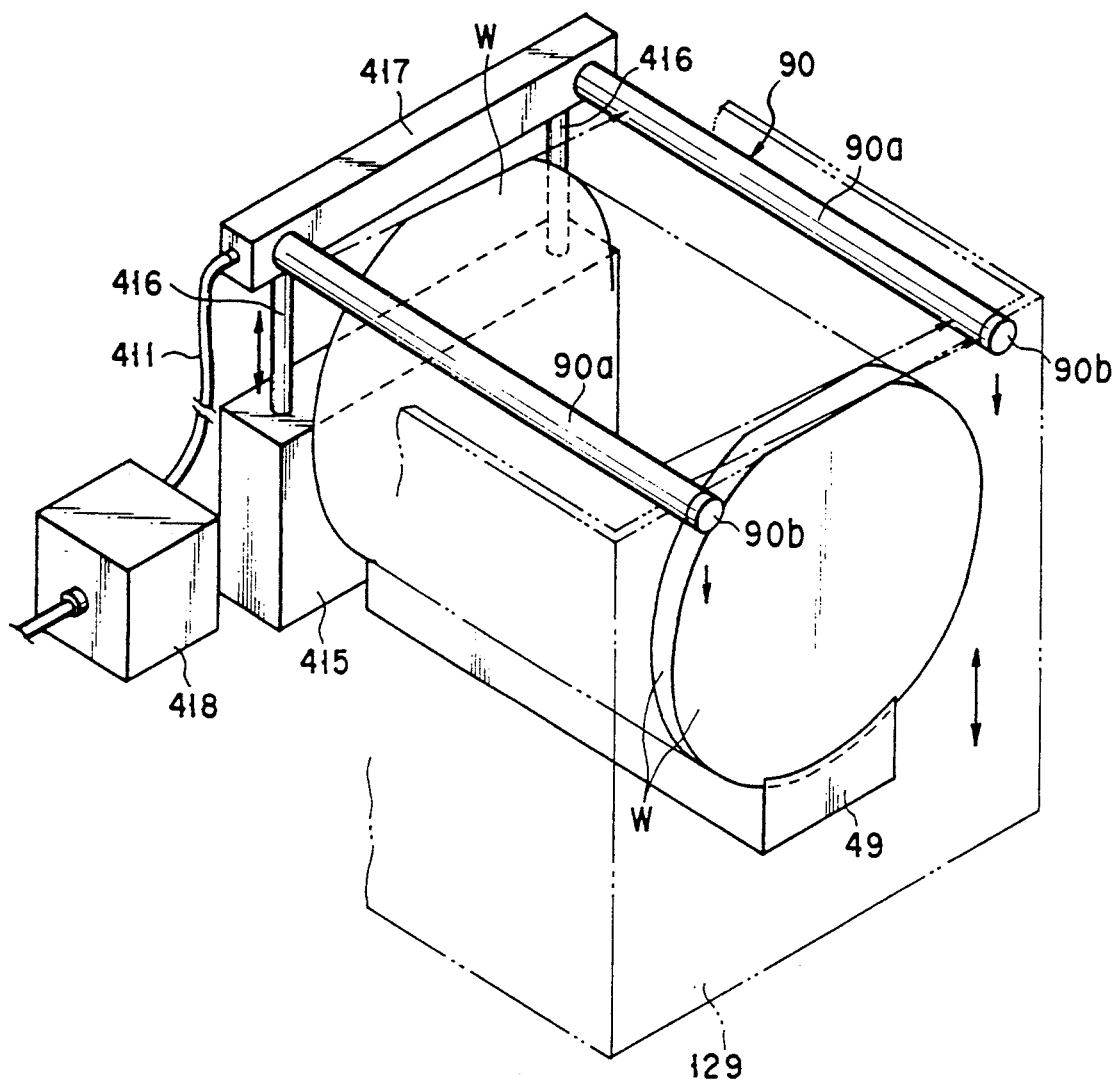
FIG. 16 is a perspective view showing a sensor unit of an independent driven type.

A wafer counter according to still another embodiment will be described with reference to FIGS. 16, 17, and 18. A sensor unit 90 of this embodiment is substantially the same as the sensor unit 90 shown in FIGS. 10 and 11, except that the distal end of the sensor unit 90 is covered with a cap 90b.

In the wafer counter of this embodiment, a pair of sensor units 90 can be moved relative to wafers W. An end of the pair of sensor units 90 is attached to a stay 417, which is supported by a cylinder rod 416 of an elevator mechanism 415. Light emitting elements E1--E26 and light receiving elements R1-R25 are connected to a light emitting/receiving control logic circuit 419 of a controller 418 through a cable 411.

Figure 17:
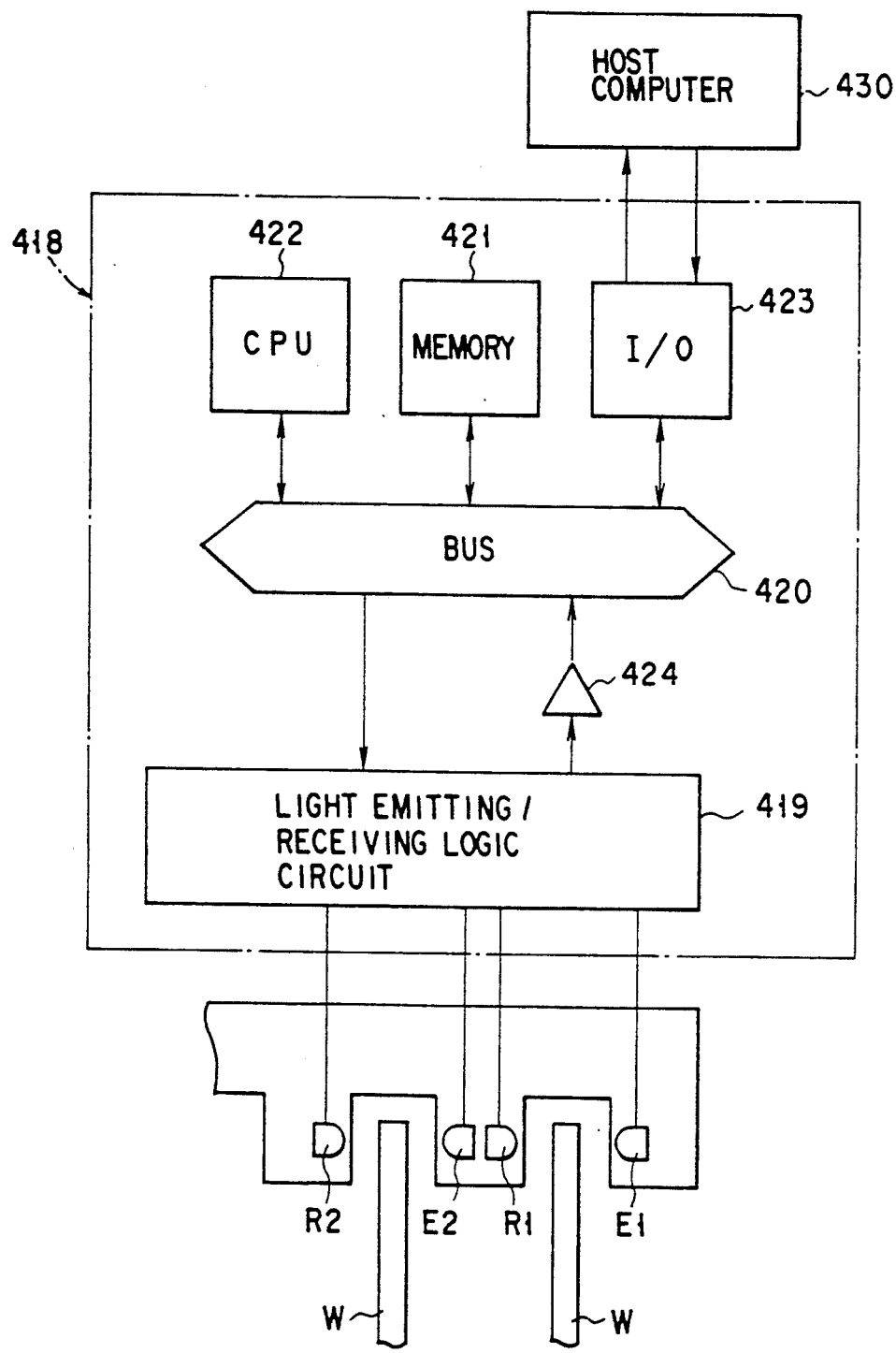
FIG. 17 is a block diagram showing a circuit of a controller.

As shown in FIG. 17, the controller 418 includes the light emitting/receiving control logic circuit 419, a bus 420, a memory 421, a CPU 422, an I/O unit 423, and an A/D converter 424. The light emitting/receiving control logic circuit 419 switches the light emitting elements E and causes the light receiving elements R to detect a light beam in accordance with a switching operation. The bus 420 transfers a control signal and data on the amount of a received light beam between the logic 419 on one hand, and the memory 421, the CPU 422, and the I/O unit 423 on the other. The CPU 422 compares data prestored in the memory 421 with the amount of a received light beam. The I/O unit 423 transmits/receives a signal to/from a host computer 430. Since data of the amount of a light beam output from the logic circuit 419 is an analog signal, it is converted to a digital signal by the A/D converter 424.

An operation of the above wafer counter will now be described.

When a wafer W crosses an optical axis of a light beam by relative movement of the sensor unit 90 and a wafer boat 49, the amount of the light received by the light receiving element R changes. The change in the amount of the light is detected by the controller 418. The data of the received light beam is compared with preset data (stored in the memory 421), and subjected to a calculation. Based on the calculation result, whether a wafer W is present or not is determined. When the level of detection data is of a predetermined level or lower, it is determined that a wafer is present, and the detection data is stored in the host computer 430. The level of detection data can be continuously monitored on the basis of a signal output from the host computer 430. The monitor operation is stopped after a wafer W and/or the detection means is moved, and data representing whether a wafer W is present is extracted. A period of one cycle, in which the CPU 422 detects all the wafers W on the boat, is 50 msec. The width of a light beam, which is emitted from a light emitting element to a light receiving element and is scattered by the edge of a wafer, is 1 mm. Accordingly, the rate of relative movement of the wafers W and the sensor need not be higher than 1.0 mm/sec, assuming that the time margin is twice the period of one cycle.

Figure 18:
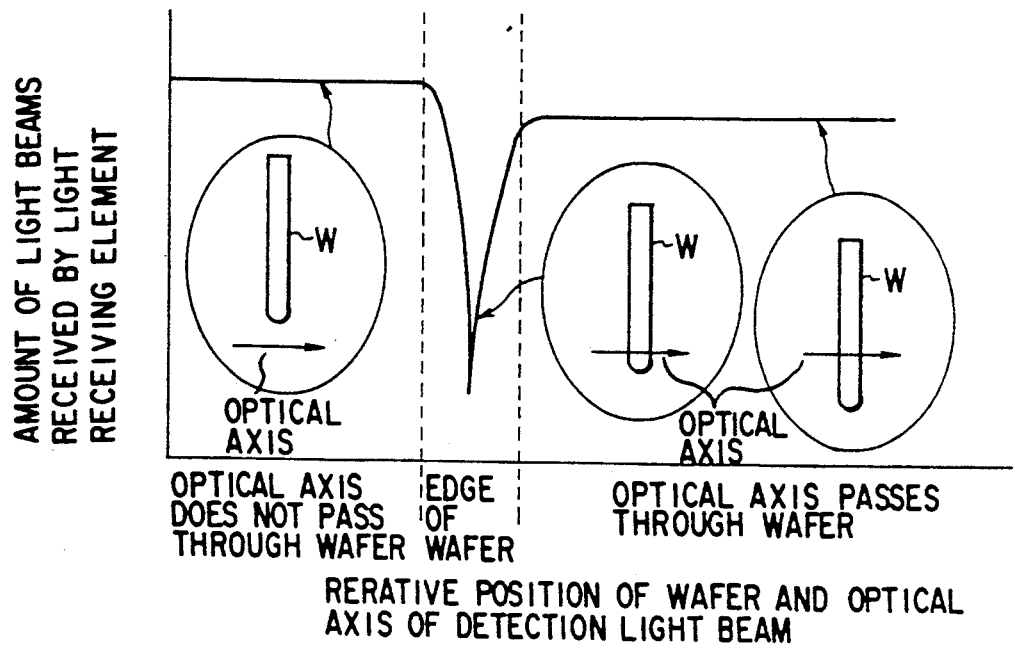
FIG. 18 is a characteristic graph showing a change in the amount of light received by a light receiving element.

FIG. 18 is a characteristic graph showing the influence of the relative position of the sensor unit and a wafer on the amount of light beams received by a light receiving element. In the graph, the abscissa represents the relative position of the wafer with respect to the optical axis of a detection light beam, and the ordinate represents the amount of light beams received by a light receiving element. As is clearly shown in the graph, when the edge portion of a wafer crosses the optical axis, the amount of received light beams is greatly reduced. Thus, present of a wafer W can be detected based on the amount of received light beams.

Still another embodiment will be described with reference to FIGS. 19 to 27B.

Figure 19:
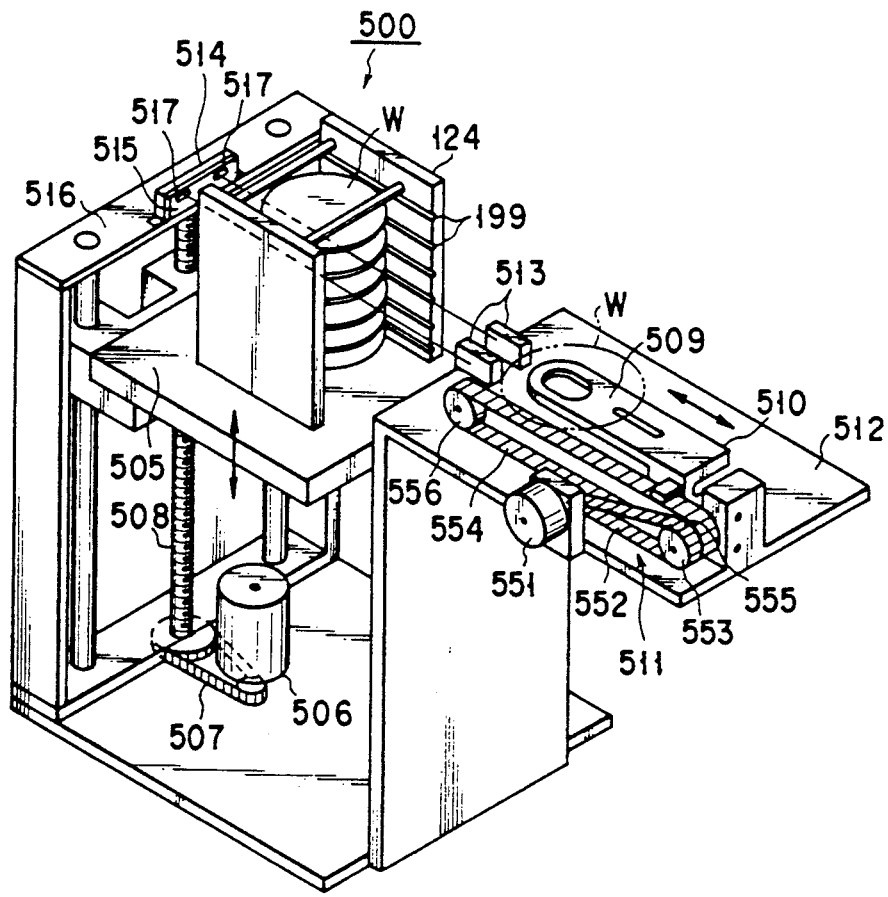
FIG. 19 is a perspective view showing a device for detecting wafers when they are transferred to or from the detector.
Figure 20:
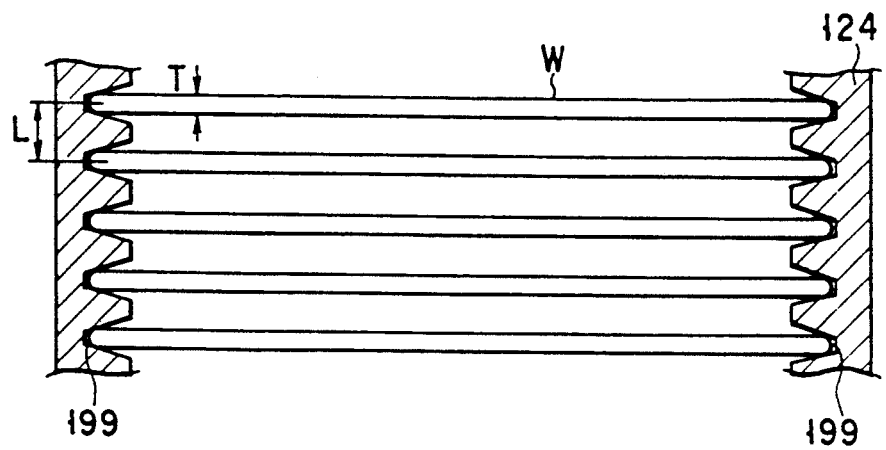
FIG. 20 is a sectional view showing a part of a cassette which holds wafers.
Figure 21:
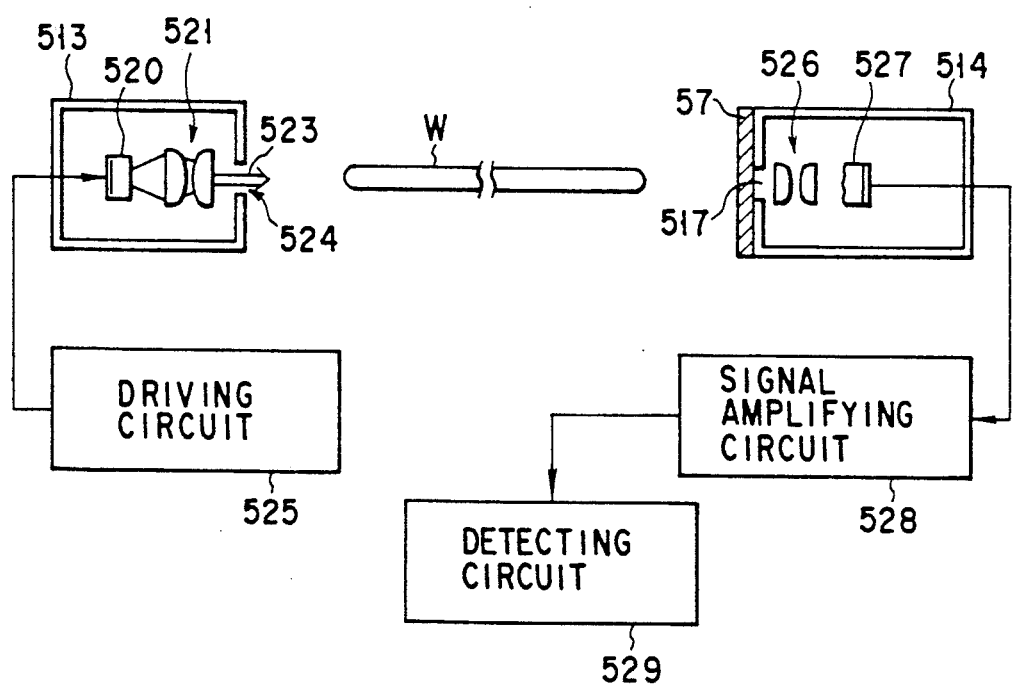
FIG. 21 is a schematic block diagram showing a wafer detecting system.

As shown in FIGS. 19, 20, and 21, a wafer detector device 500 comprises cassette elevator assemblies 505, 506, 507, and 508, and sensor assemblies 509, 510, 511, 512, 513, 514, 515, 516, and 517. A cassette 124 is mounted on a stage 505. The stage 505 is connected to and supported by a ball screw 508. A timing belt 507 is put on a pulley of the ball screw 508 and a driving shaft of an AC servo motor 506.

As shown in FIG. 20, wafers W are supported by grooves 199 formed at regular intervals L in a cassette 124. In this embodiment, the interval L is 4.76 mm±0.8 mm and the thickness of each wafer W is about 0.8 mm.

A vacuum chuck arm 510 for holding wafers W by suction is provided near the cassette 124. A hole 509, which communicates with a suction pipe (not shown), is formed on a distal end portion of the arm 510. The vacuum chuck arm is moved forward to or backward from the cassette 124 by an arm transfer mechanism 511, which is mounted on a first fixing table 512. The arm transfer mechanism 511 is constituted by belt mechanisms 551 to 556. A first belt 552 is put on a driving shaft of a motor 551 and a pulley 553 and a second belt 554 is put on pulleys 555 and 556. The pulley 553 and 555 are coaxially connected with each other.

A wafer detecting mechanism includes a pair of light emitting sections 513 and a pair of light receiving sections 517. The light emitting sections 513 face the light receiving sections 517 with the wafer cassette 124 interposed therebetween. Transmission type infrared sensors are used as elements 520 and 527 of the light emitting and receiving sections 513 and 517.

A shown in FIG. 21, a light emitting element 520 is fixed in each of the light emitting section 513. A driving circuit 525 is connected to the light emitting element 520. A laser beam 523 is emitted from an opening 524 after passing through a lens 521. A polarization filter 57 is attached to an opening of each of the light receiving sections 514. An incident light passes through the polarization filter 57 and a lens 526 and reaches the light receiving element 527. The light receiving element 527 is connected to a signal amplifying circuit 528, which is connected to a detecting circuit 529.

An operation of the above wafer counter 500 will be described with reference to FIGS. 22A, 22B, 23A and 23B.

While the stage 505 is moving up and down, the positions of wafers W and whether the wafers W are horizontal are detected by two infrared sensors constituted by the light emitting sections 513 and the light receiving sections 514. The detection result is stored in a memory of the controller. The position of a wafer W is detected by first measuring the position at which the light path of the laser beam 523 is interrupted by the wafer W and then, the position at which the laser beam is entirely received by the light receiving section. The positions are stored in the memory and a gradient of the wafer W is obtained by calculation using the distance between the positions as a constant.

Figure 22A:
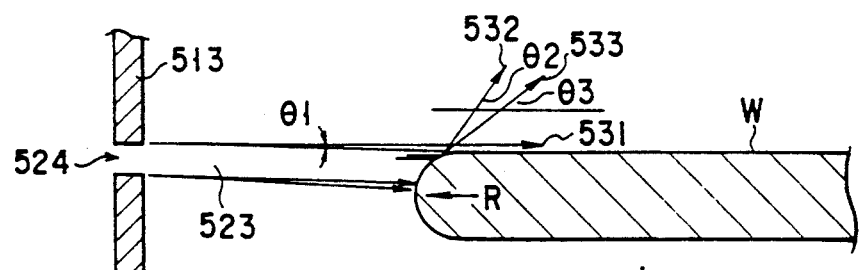
FIG. 22A is an enlarged sectional view showing an edge portion of a wafer for explaining scattering of a light beam applied thereto.
Figure 22B:
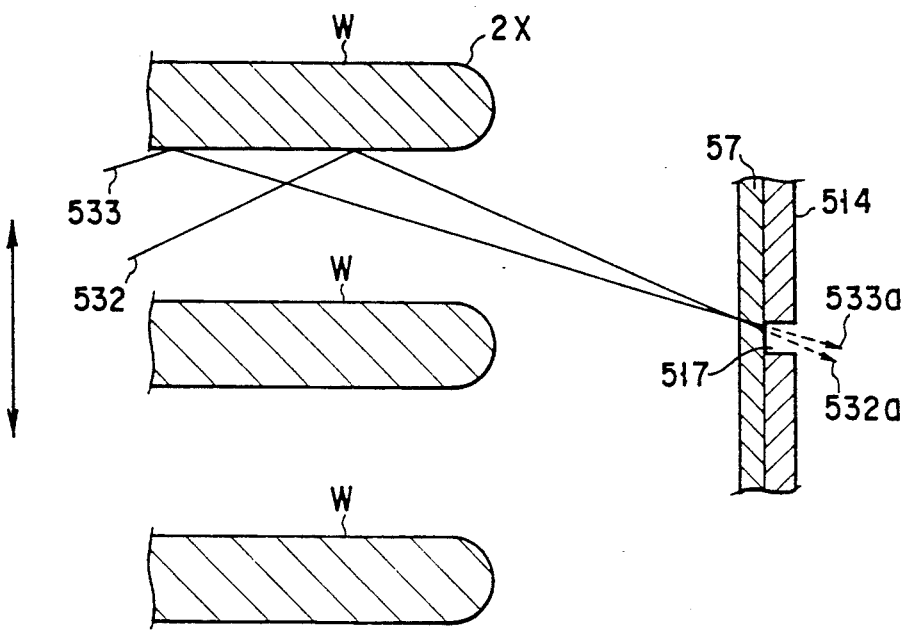
FIG. 22B is an enlarged sectional view showing an edge portion of a wafer for explaining reception of a scattered light beam.

However, as shown in FIG. 22A, the laser beam 523 travels at a beam angle $\theta$. In addition, the wafer W moves up and down in accordance with the movement of the elevator assembly. The edge of the wafer W has a curved surface having a radius R of curvature. The laser beam 523 is reflected by the curved edge and scattered as reflection light beams 532 and 533 of reflection angles of $\theta 2$ and $\theta 3$.

The scattered light beams 532 and 533 are reflected by a wafer 2X which is located above the wafer W to be detected. The reflected light beams 532 and 533 are further reflected and finally incident on the polarization filter 57. The scattered light beams 532 and 533 incident on the polarization filter 57 at the angle $\theta 3$ are removed by the polarization filter 57.

Figure 23A:
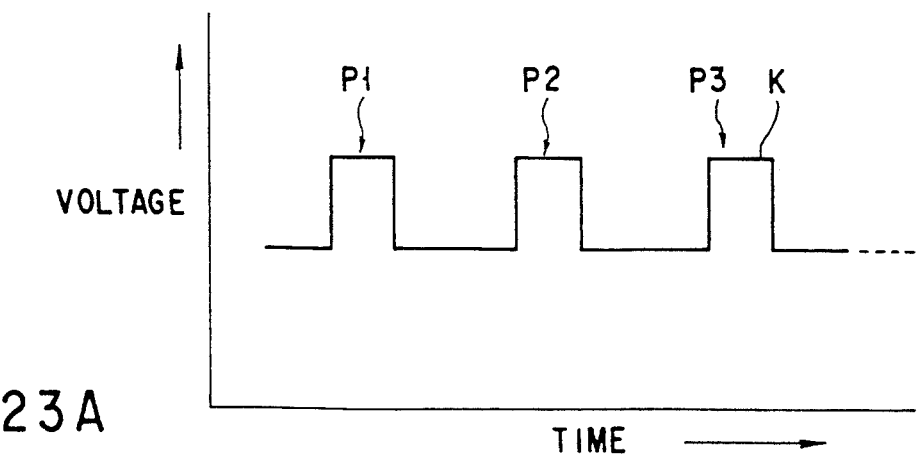
FIG. 23A is a diagram showing a waveform of an output from an infrared sensor of the detector device of the embodiment.

In the above wafer counter, since the polarization filter 57 is attached to the light receiving section 514, a waveform K output from the light receiving element 427 to the signal amplifying circuit 528 is as shown in FIG. 23A. In FIG. 23A, a peak P1 of the waveform corresponds to the time when an n-th wafer interrupts the beam light, a peak P2 corresponds to the time when an (n+1)th wafer interrupts the beam light, and a peak P3 corresponds to the time when an (n+2)th wafer interrupts the beam light. Thus, the positions of the wafers W in the cassette 124 can be successively detected.

Figure 23B:
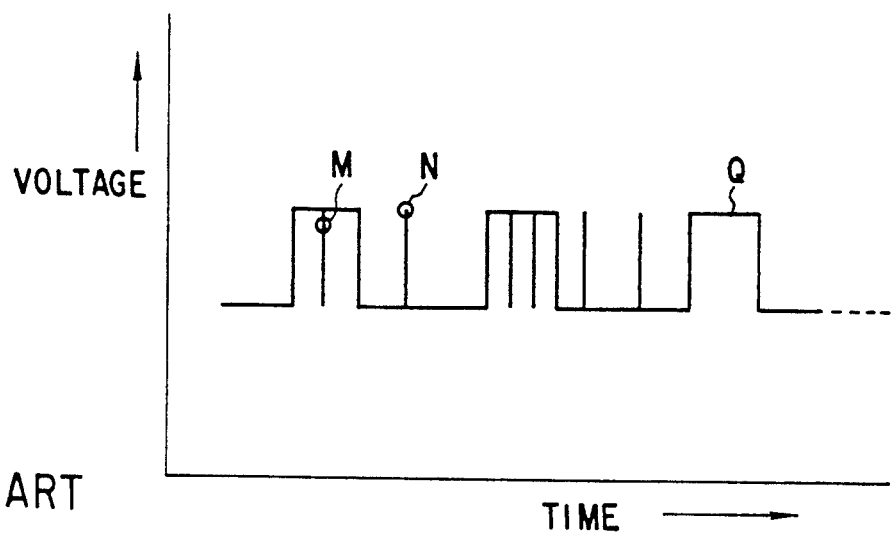
FIG. 23B is a diagram showing a waveform of an output from an infrared sensor of the conventional detector device.

In contrast, a waveform Q of the conventional wafer counter is as shown in FIG. 23B, i.e., a glitch M appears when the wafer W interrupt the light path and an edge N appears when the light path is not interrupted.

Still another embodiment of the present invention will be described with reference to FIGS. 24 to 27B. In the following, descriptions of the same portions as in the above embodiments will be omitted.

Figure 24:
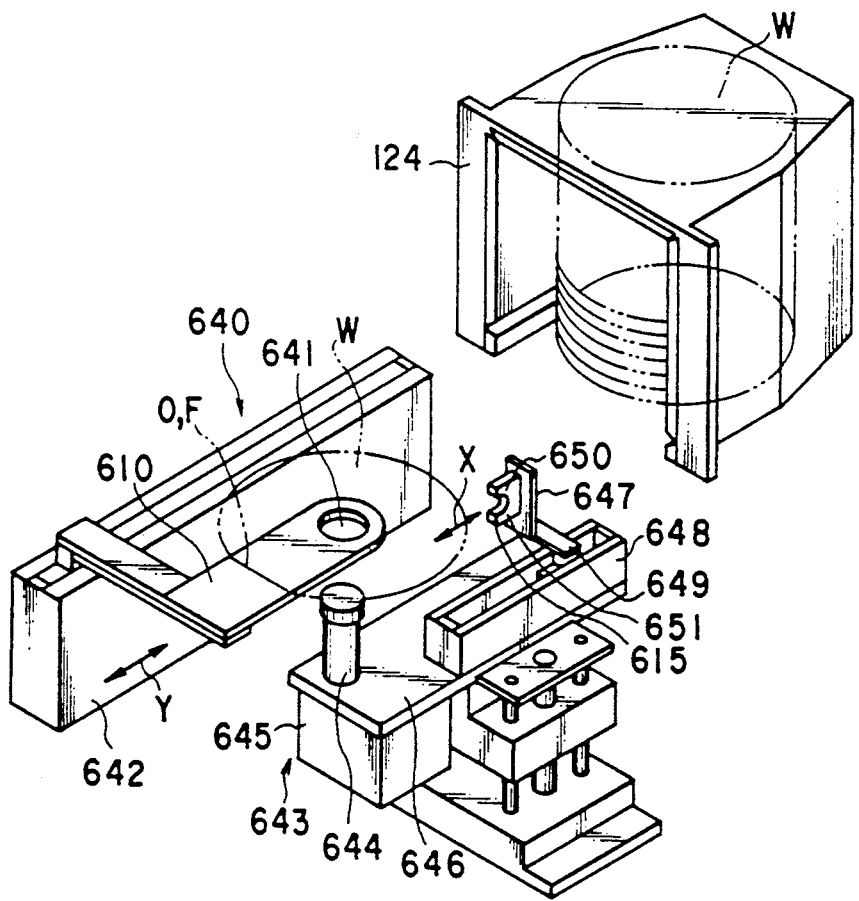
FIG. 24 is a perspective view showing a wafer detector device according to another embodiment of the present invention.

As shown in FIG. 24, the cassette 124 is placed on a stage (not shown) and moved up and down. A transfer device 640 is arranged in front of the cassette 124. The transfer device 640 comprises a vacuum chuck arm 610 having substantially the same construction as the above-mentioned vacuum chuck arm 510. The vacuum chuck arm is movable in a Y direction by a driving unit 642 having a stepping motor.

A wafer holding mechanism 643 is arranged in a movement path of the vacuum chuck arm 610. A cylindrical chuck base 644 is mounted the wafer holding mechanism 643. A driving unit 645 having a stepping motor is provided under the chuck base 644.

A position detecting mechanism 647 is mounted on a base 646, to detect the position of the edge of a wafer W. The position detecting mechanism 647 comprises an image sensor. The image sensor has a light emitting section 650 which emits laser beams of a wavelength of about 780 nm, and also has a light receiving section 651 for receiving the laser beams. The position detecting mechanism 647 is movable in an X-direction by a driving unit 648 having a stepping motor.

Figure 25:
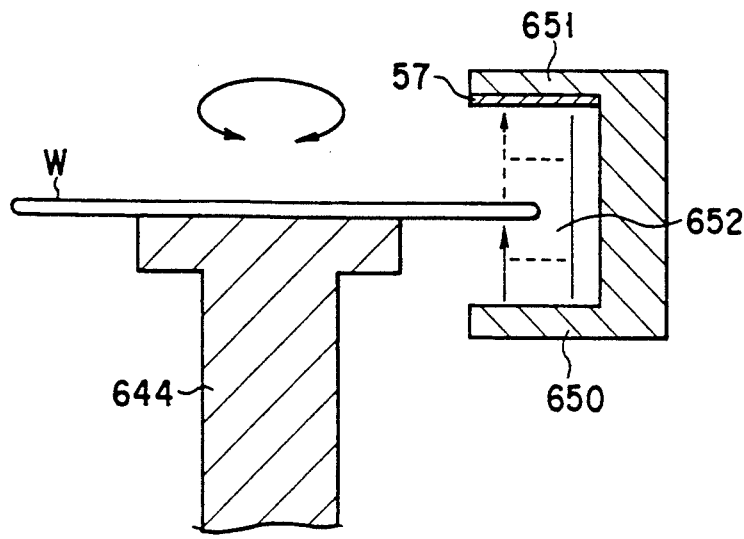
FIG. 25 is a sectional view showing a sensor section of the wafer detector device.

As shown in FIG. 25, the light emitting section 650 emits a laser beam band 652. The laser beam band is about 400 mm wide, and a portion of the beam is interrupted by a wafer W and the remaining portion is received by the light receiving section 651. A polarization filter 57 for removing a scattered light is attached to the light receiving section 651. When the laser beam band 652 is applied to the wafer W which is rotating, it is interrupted by the wafer W in a range of 0 to 400 mm in width. The interrupted width or transmitted width is detected by the light receiving section 651 and a detected signal is input to a detecting circuit (not shown), with the result that the position of an orientation flat O.F. of the wafer W is detected. A positional detection signal is transmitted to the driving unit 645 to control the rotation angle of the chuck base 644.

Figure 26:
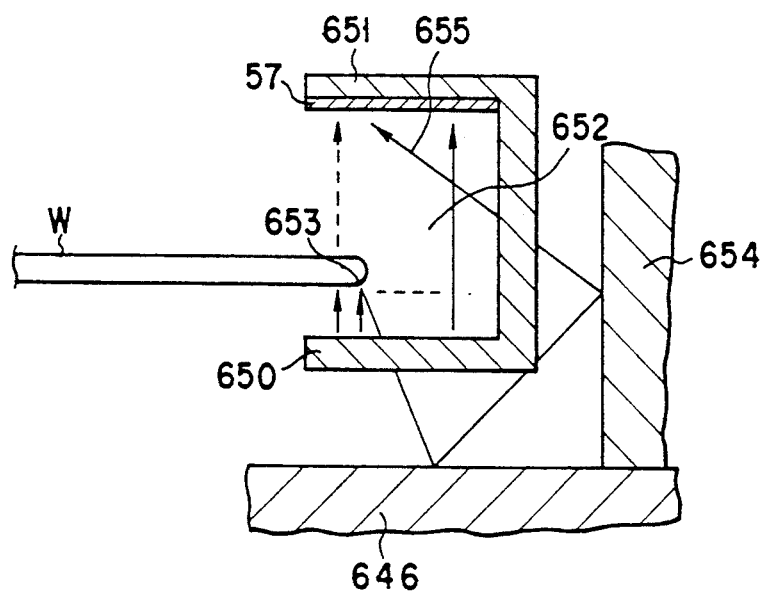
FIG. 26 is an enlarged sectional view showing a part of a wafer and a part of the sensor section for explaining reflection of a detection light beam (infrared light beam)

As shown in FIG. 26, the laser beam 652 is interrupted by the wafer W, and a portion of the beam is scattered by an edge portion 653 of the wafer. The scattered light beam is further reflected by walls 646 and 654 and finally, incident on the light receiving section 651.

The walls 646 and 654 are made of stainless steel which is not painted, since a clean room (in which the detector is placed) must be kept so clean that presence of even a minute particle is not permitted. Thus, the walls 646 and 654 have a great reflectivity, and accordingly, a considerable amount of light beam is scattered. However, since most of the scattered light beams is removed by the polarization filter 57, the accuracy of detecting wafers is improved.

Figure 27A:
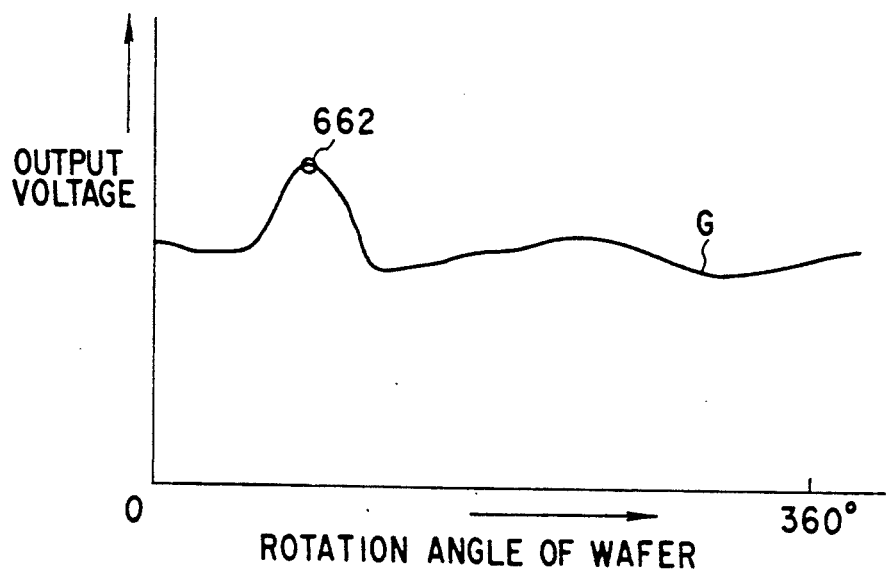
FIG. 27A is a characteristic graph obtained when a wafer is detected by the detector device according to the embodiments of the present invention.

As shown in FIG. 27A, according to the device of the embodiment, an output signal waveform G of low noise is obtained. In the waveform G, a first peak point 662 of the output voltage corresponding to a position at which the orientation flat O.F. of the wafer W is detected. On the basis of input data at the first peak point 662, the wafer W is rotated so that the orientation flat O.F is directed in a desired direction (positioning).

Figure 27B:
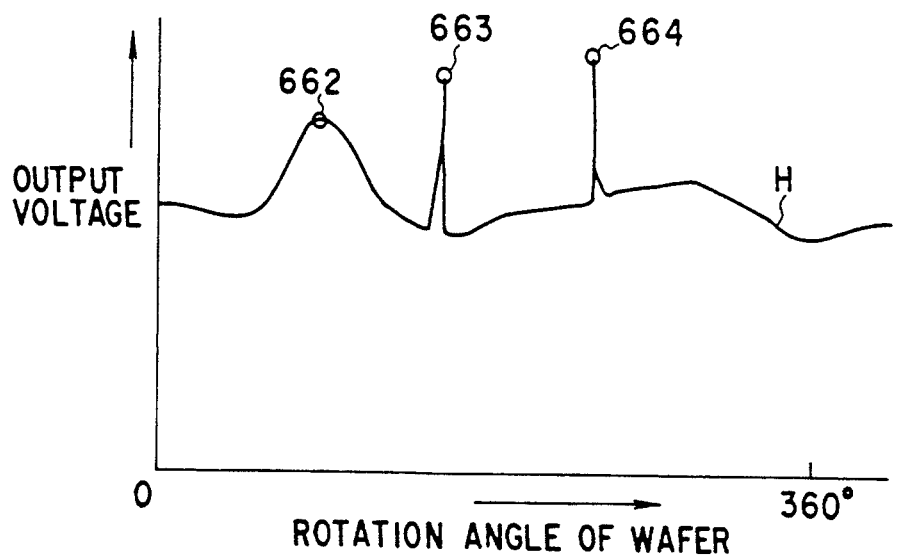
FIG. 27B is a characteristic graph obtained when a wafer is detected by the conventional detector device.

In contrast, according to the conventional device, an output signal waveform H of high noise is obtained, as shown in FIG. 27B. In this output signal waveform H, two edges 663 and 664 appear, since a reflected light 655 is directly incident on the light receiving section 651.

Since the output voltages at the edges 663 and 664 are higher than the output voltage at the first peak point 662, the two edges can be erroneously detected as the position at which the orientation flat O.F. is detected. Therefore, the chuck base 644 cannot be accurately positioned.

Although the semiconductor wafers W have been detected in the case of the above-described detector devices, LCD substrates, printed boards and other substrates can be detected as well.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A substrate detector device for detecting the presence and the number of a plurality of substrates arranged face to face, the device comprising:

holding means for holding substrates;

light emitting means having a plurality of light emitting elements, arranged side by side, for respectively applying light beams to the substrates;

light receiving means, facing the light emitting means and having a plurality of light receiving elements, for receiving light beams passed through a space where the substrates are to be placed, the light receiving elements arranged side by side, said light receiving elements and the light emitting elements are arranged in a staggered fashion; and polarization filter means which allow passage of only optical beams emitted from the light emitting element and to be directly incident on the light receiving elements.

2. A substrate detector device according to claim 1, further comprising:

storage means for storing, as reference data, an amount of light received by a receiving element which has been measured in advance when a light beam is applied to a substrate in a state where no other substrate is present on either side of the substrate; and discriminating means for discriminating the presence and the number of the substrates on the holding means based on the reference data and measured data based on the amount of light received by the light receiving elements after a light beam scattered by the substrate to be detected and a light beam wrap-around substrates adjacent thereto are removed by the polarization filter means.

3. A substrate detector device according to claim 1, further comprising determining means for determining that a substrate is not correctly placed at a position or a substrate is not present at the position, when the measured data exceeds the reference data.

4. A substrate detector device according to claim 1, further comprising correcting means for, when the measured data exceeds the reference data, correcting the amount of light received by a light receiving element by subtracting 20% to 50% of the difference between the measured data and the reference data from the amount of light received by light receiving elements adjacent to the light receiving element.

5. A substrate detector device according to claim 1, wherein the holding means is constituted by a wafer chuck having a pair of chuck arms for holding semiconductor wafers, one of the chuck arms having the light emitting elements and the other having the light receiving elements and the poralization filter means.

6. A substrate detector device according to claim 1, further comprising holder members for holding the light emitting elements and the light receiving elements, respectively, wherein poralization filter means is attached to the holder member for holding the light receiving elements.

7. A substrate detector device according to claim 6, further comprising cases for encasing the holder members to protect the light emitting elements and the light receiving elements.

8. A substrate detector device according to claim 7, wherein the cases are made of quartz.

9. A substrate detector device according to claim 7, wherein the cases are cylindrical tubes.

10. A substrate detector device according to claim 7, wherein the cases are rectangular boxes, and the holder members are placed on the bottoms of the cases.

11. A substrate detector device according to claim 7, further comprising gas supplying means for supplying gas into the cases.

12. A substrate detector device according to claim 11, further comprising exhaust means for exhausting the gas from the cases.

13. A substrate detector device according to claim 7, further comprising elevator means for moving up and down the light emitting elements and the light receiving elements, together with the cases.

* * * * *